United States Patent
Yoo et al.

(10) Patent No.: US 11,793,160 B2
(45) Date of Patent: Oct. 24, 2023

(54) LIQUID DISPENSER FOR ANIMALS

(71) Applicant: LG ELECTRONICS INC., Seoul (KR)

(72) Inventors: Hyunsun Yoo, Seoul (KR); Jaehung Chun, Seoul (KR); Yousook Eun, Seoul (KR); Joogyeom Kim, Seoul (KR); Sungkyung Kim, Seoul (KR); Myongsun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 517 days.

(21) Appl. No.: 16/570,279

(22) Filed: Sep. 13, 2019

(65) Prior Publication Data

US 2020/0085002 A1    Mar. 19, 2020

Related U.S. Application Data

(60) Provisional application No. 62/733,393, filed on Sep. 19, 2018.

(30) Foreign Application Priority Data

Nov. 1, 2018   (KR) .................. 10-2018-0132643
Nov. 1, 2018   (KR) .................. 10-2018-0132645
May 21, 2019   (KR) .................. 10-2019-0059513

(51) Int. Cl.
*A01K 7/02*     (2006.01)
*B67D 1/10*     (2006.01)
(Continued)

(52) U.S. Cl.
CPC ............ *A01K 7/025* (2013.01); *B67D 1/0004* (2013.01); *B67D 1/0872* (2013.01); *B67D 1/10* (2013.01)

(58) Field of Classification Search
USPC ......... 119/74, 72, 75, 76, 77, 78, 79, 80, 73, 119/51.5; D30/121, 132
See application file for complete search history.

(56) References Cited

U.S. PATENT DOCUMENTS 1,218,969 A     3/1917   Ziener
1,243,126 A  * 10/1917   Ziener ................... B05B 17/08
                                                  239/20
(Continued)

FOREIGN PATENT DOCUMENTS

CA          2082083         5/1994
CA          2587229         5/2006
(Continued)

OTHER PUBLICATIONS

United States Office Action dated Feb. 1, 2022 issued in co-pending related U.S. Appl. No. 16/574,237.
(Continued)

*Primary Examiner* — Andrea M Valenti
(74) *Attorney, Agent, or Firm* — KED & ASSOCIATES, LLP

(57) ABSTRACT

A pet water dispenser may include a water tank having an upper opening, a pump installed inside the water tank, a water supply pipe connected to the pump to transfer water, and a water supply plate having a water supply hole through which water is supplied from the water supply pipe. The water supply plate may include a plate body inclined upward from the water supply hole to an edge of the water supply plate. Water ejected from the water supply hole may form a ring or a water wall that pets may consume from all angles around the pet water dispenser.

20 Claims, 15 Drawing Sheets

(51) Int. Cl.
    *B67D 1/08*        (2006.01)
    *B67D 1/00*        (2006.01)

(56)                References Cited

U.S. PATENT DOCUMENTS

| | | | |
|---|---|---|---|
| 1,512,629 | A * | 10/1924 | Mueller ............... E03B 9/20 |
| | | | 239/31 |
| 2,103,653 | A * | 12/1937 | Weil ............... B05B 17/085 |
| | | | 261/115 |
| 2,510,446 | A * | 6/1950 | Weil ............... B05B 17/08 |
| | | | 239/23 |
| 3,076,435 | A | 2/1963 | Seymour |
| 3,303,824 | A | 2/1967 | Anderson |
| 3,417,814 | A | 12/1968 | Oktay |
| 3,441,003 | A | 4/1969 | Du Mond et al. |
| D221,755 | S * | 9/1971 | Johnson ............... D23/201 |
| 3,691,787 | A | 9/1972 | Kaufmann |
| 4,100,885 | A | 7/1978 | Kapplinger |
| 4,133,456 | A | 1/1979 | Corini |
| 4,286,546 | A | 9/1981 | Moore |
| 4,561,384 | A | 12/1985 | Liff |
| 4,640,226 | A | 2/1987 | Liff |
| 4,932,561 | A | 6/1990 | Boxall |
| 5,031,689 | A | 7/1991 | Jones et al. |
| 5,105,771 | A | 4/1992 | Schafer |
| 5,140,134 | A | 8/1992 | Reusche et al. |
| 5,174,245 | A | 12/1992 | Bishop |
| 5,205,242 | A | 4/1993 | Kasselman |
| 5,209,069 | A | 5/1993 | Newnan |
| 5,345,063 | A | 9/1994 | Reusche et al. |
| 5,560,211 | A | 10/1996 | Parker |
| 5,601,199 | A | 2/1997 | Marty |
| 5,699,669 | A | 12/1997 | Gebhard |
| 5,782,094 | A | 7/1998 | Freeman |
| 5,791,287 | A | 8/1998 | Gruber |
| 5,799,609 | A | 9/1998 | Burns et al. |
| 5,845,605 | A | 12/1998 | Malamphy |
| 5,862,669 | A | 1/1999 | Davis |
| 5,884,582 | A | 3/1999 | Duckworth |
| 5,941,077 | A | 8/1999 | Safyan |
| 6,003,318 | A | 12/1999 | Busick |
| 6,230,653 | B1 | 5/2001 | Tobin |
| 6,460,483 | B1 | 10/2002 | Northrop et al. |
| 6,622,657 | B2 | 9/2003 | Northrop et al. |
| 6,644,037 | B2 | 11/2003 | Busick |
| 6,705,540 | B2 * | 3/2004 | Koshiyama ............. B05B 1/265 |
| | | | 239/524 |
| 6,848,392 | B1 | 2/2005 | Kreutzer, Jr. |
| 7,089,881 | B2 | 8/2006 | Plante |
| 7,270,082 | B2 | 9/2007 | Plante |
| 7,549,395 | B2 | 6/2009 | Stenberg |
| 7,600,486 | B2 | 10/2009 | Ellis |
| 7,743,698 | B2 * | 6/2010 | Muir ............... B05B 9/002 |
| | | | 239/722 |
| 7,823,538 | B1 | 11/2010 | Merager |
| 7,958,844 | B1 | 6/2011 | Northrop |
| 8,117,991 | B1 | 2/2012 | Civitillo |
| 8,210,447 | B2 | 7/2012 | Cohen |
| 8,387,566 | B2 | 3/2013 | Graves et al. |
| 8,770,147 | B2 | 7/2014 | Rowe |
| 8,770,148 | B2 | 7/2014 | Lipscomb et al. |
| 9,035,222 | B2 | 5/2015 | Alexander |
| D738,579 | S * | 9/2015 | Owens ............... D30/132 |
| D755,449 | S * | 5/2016 | Cornwell, Jr. ............... D30/132 |
| 9,497,930 | B2 | 11/2016 | Lipscomb et al. |
| D819,898 | S * | 6/2018 | Poisson ............... D30/132 |
| 10,165,753 | B1 | 1/2019 | Huang |
| 11,154,034 | B2 | 10/2021 | Youn et al. |
| 11,160,250 | B2 | 11/2021 | Yoo et al. |
| 11,590,438 | B2 | 2/2023 | Yoo |
| 2002/0020673 | A1 | 2/2002 | Nohren et al. |
| 2003/0115902 | A1 | 6/2003 | Busick et al. |
| 2003/0140864 | A1 | 7/2003 | Wenstrand |
| 2003/0213437 | A1 | 11/2003 | Norris |
| 2005/0166853 | A1 * | 8/2005 | Plante ............... A01K 5/0114 |
| | | | 119/74 |
| 2006/0174838 | A1 * | 8/2006 | Plante ............... A01K 7/02 |
| | | | 119/74 |
| 2006/0231040 | A1 | 10/2006 | Bast et al. |
| 2006/0283972 | A1 | 12/2006 | Muir et al. |
| 2006/0288947 | A1 | 12/2006 | Perlsweig et al. |
| 2007/0045159 | A1 | 3/2007 | Lee |
| 2007/0095297 | A1 * | 5/2007 | Boyd ............... A01K 7/022 |
| | | | 119/74 |
| 2007/0199512 | A1 | 8/2007 | Ellis |
| 2007/0227456 | A1 | 10/2007 | Borey |
| 2008/0078330 | A1 | 4/2008 | McCallum et al. |
| 2008/0169249 | A1 * | 7/2008 | Ter Stege ............... A47G 7/06 |
| | | | 210/85 |
| 2008/0190374 | A1 | 8/2008 | Farris |
| 2008/0257272 | A1 * | 10/2008 | Bolda ............... C02F 1/325 |
| | | | 119/72 |
| 2009/0078209 | A1 | 3/2009 | Kroeker |
| 2009/0126641 | A1 * | 5/2009 | Anderson ............... A01K 5/0135 |
| | | | 119/61.5 |
| 2009/0218985 | A1 | 9/2009 | Hallett |
| 2010/0095897 | A1 | 4/2010 | Rowe |
| 2010/0276508 | A1 * | 11/2010 | Davies ............... F21V 23/0435 |
| | | | 239/18 |
| 2010/0300366 | A1 | 12/2010 | Lipscomb et al. |
| 2011/0067638 | A1 * | 3/2011 | Lipscomb ............... A01K 7/02 |
| | | | 137/560 |
| 2011/0102945 | A1 | 5/2011 | Isono et al. |
| 2011/0214613 | A1 | 9/2011 | Diamond |
| 2011/0226470 | A1 | 9/2011 | Latrille et al. |
| 2011/0259273 | A1 | 10/2011 | Lipscomb et al. |
| 2012/0017839 | A1 | 1/2012 | Veness et al. |
| 2012/0111280 | A1 | 5/2012 | Shin et al. |
| 2012/0216751 | A1 | 8/2012 | Rowe |
| 2013/0087102 | A1 | 4/2013 | Lipscomb et al. |
| 2013/0092090 | A1 | 4/2013 | McCallum |
| 2013/0175802 | A1 | 7/2013 | Breau et al. |
| 2013/0192529 | A1 | 8/2013 | Kruger et al. |
| 2013/0200064 | A1 | 8/2013 | Alexander |
| 2013/0228132 | A1 | 9/2013 | Lipscomb et al. |
| 2013/0255280 | A1 | 10/2013 | Murphy et al. |
| 2014/0033984 | A1 | 2/2014 | Li et al. |
| 2014/0053781 | A1 | 2/2014 | Lewis |
| 2014/0076242 | A1 | 3/2014 | Ho |
| 2014/0165607 | A1 | 6/2014 | Alexander |
| 2014/0251223 | A1 | 9/2014 | Rowe et al. |
| 2014/0353335 | A1 | 12/2014 | Van Diepen |
| 2015/0135728 | A1 | 5/2015 | Swanson et al. |
| 2015/0189862 | A1 | 7/2015 | Lipscomb |
| 2015/0196157 | A1 * | 7/2015 | Swisth ............... A47J 27/13 |
| | | | 220/573.1 |
| 2015/0276204 | A1 | 10/2015 | Ray |
| 2015/0313180 | A1 | 11/2015 | Lipscomb et al. |
| 2015/0353335 | A1 | 12/2015 | Breault |
| 2016/0000037 | A1 | 1/2016 | Lipscomb et al. |
| 2016/0099599 | A1 | 4/2016 | Ho et al. |
| 2016/0113249 | A1 | 4/2016 | Kuo |
| 2016/0118179 | A1 | 4/2016 | Park et al. |
| 2016/0159633 | A1 | 6/2016 | Diffenderfer |
| 2016/0286757 | A1 | 10/2016 | Armstrong |
| 2016/0287363 | A1 | 10/2016 | Miller |
| 2017/0245465 | A1 | 8/2017 | Oates et al. |
| 2017/0255186 | A1 | 9/2017 | Ryznar et al. |
| 2018/0054073 | A1 | 2/2018 | Olson et al. |
| 2018/0160648 | A1 | 6/2018 | Goh |
| 2018/0177325 | A1 | 6/2018 | Lyons et al. |
| 2019/0075755 | A1 | 3/2019 | Imaizumi et al. |
| 2019/0140471 | A1 | 5/2019 | Johanski et al. |
| 2019/0162460 | A1 | 5/2019 | Oh |
| 2019/0227580 | A1 | 7/2019 | von der Assen et al. |
| 2019/0239476 | A1 | 8/2019 | Mai et al. |
| 2019/0239491 | A1 | 8/2019 | Yu et al. |
| 2019/0357747 | A1 | 11/2019 | Keiler, III |
| 2020/0303971 | A1 | 9/2020 | Hall et al. |

(56) References Cited

U.S. PATENT DOCUMENTS

| | | | |
|---|---|---|---|
| 2020/0337266 | A1 | 10/2020 | Yu et al. |
| 2020/0355751 | A1 | 11/2020 | Swaans et al. |

FOREIGN PATENT DOCUMENTS

| | | |
|---|---|---|
| CH | 711714 | 1/2022 |
| CN | 2322412 | 6/1999 |
| CN | 2351955 | 12/1999 |
| CN | 1701206 | 11/2005 |
| CN | 2776044 | 5/2006 |
| CN | 1824622 | 8/2006 |
| CN | 1870903 | 11/2006 |
| CN | 200994393 | 12/2007 |
| CN | 200994394 | 12/2007 |
| CN | 201365463 | 12/2009 |
| CN | 201422313 | 3/2010 |
| CN | 201530253 | 7/2010 |
| CN | 101790970 | 8/2010 |
| CN | 201541568 | 8/2010 |
| CN | 101816289 | 9/2010 |
| CN | 101841191 | 9/2010 |
| CN | 102072468 | 5/2011 |
| CN | 102480927 | 5/2012 |
| CN | 102600661 | 7/2012 |
| CN | 202310894 | 7/2012 |
| CN | 102925877 | 2/2013 |
| CN | 102934044 | 2/2013 |
| CN | 202722224 | 2/2013 |
| CN | 202873523 | 4/2013 |
| CN | 203136752 | 8/2013 |
| CN | 203544552 | 4/2014 |
| CN | 203618522 | 6/2014 |
| CN | 103917147 | 7/2014 |
| CN | 103931515 | 7/2014 |
| CN | 203913286 | 11/2014 |
| CN | 204707695 | 10/2015 |
| CN | 204722018 | 10/2015 |
| CN | 105265331 | 1/2016 |
| CN | 205005702 | 2/2016 |
| CN | 105792644 | 7/2016 |
| CN | 205431490 | 8/2016 |
| CN | 105923696 | 9/2016 |
| CN | 205682161 | 11/2016 |
| CN | 106172064 | 12/2016 |
| CN | 106212310 | 12/2016 |
| CN | 205830734 | 12/2016 |
| CN | 106332801 | 1/2017 |
| CN | 205884322 | 1/2017 |
| CN | 106787233 | 5/2017 |
| CN | 206142936 | 5/2017 |
| CN | 206227319 | 6/2017 |
| CN | 106962218 | 7/2017 |
| CN | 206314381 | 7/2017 |
| CN | 107041318 | 8/2017 |
| CN | 107124043 | 9/2017 |
| CN | 107259458 | 10/2017 |
| CN | 107509653 | 12/2017 |
| CN | 206699096 | 12/2017 |
| CN | 206760412 | 12/2017 |
| CN | 206760441 | 12/2017 |
| CN | 107568092 | 1/2018 |
| CN | 206851699 | 1/2018 |
| CN | 107660756 | 2/2018 |
| CN | 206949206 | 2/2018 |
| CN | 107821202 | 3/2018 |
| CN | 107897027 | 4/2018 |
| CN | 207268238 | 4/2018 |
| CN | 107969351 | 5/2018 |
| CN | 207411173 | 5/2018 |
| CN | 207443927 | 6/2018 |
| CN | 207519400 | 6/2018 |
| CN | 108271728 | 7/2018 |
| CN | 108348966 | 7/2018 |
| CN | 108353810 | 8/2018 |
| CN | 108377928 | 8/2018 |
| CN | 108464253 | 8/2018 |
| CN | 207740217 | 8/2018 |
| CN | 207803161 | 9/2018 |
| CN | 207870035 | 9/2018 |
| CN | 109513315 | 3/2019 |
| CN | 109997713 | 7/2019 |
| DE | 20 2016 107 252 | 3/2018 |
| EP | 0 894 430 | 2/1999 |
| EP | 1 188 995 | 3/2002 |
| EP | 1 566 099 | 8/2005 |
| EP | 3 315 022 | 5/2018 |
| EP | 3 520 607 | 8/2019 |
| FR | 2 726 452 | 5/1996 |
| GB | 2 458 173 | 9/2009 |
| GB | 2574921 | 12/2019 |
| JP | H05-118725 | 5/1993 |
| JP | H07-269800 | 10/1995 |
| JP | 2012-188163 | 10/2012 |
| JP | 3200546 | 10/2015 |
| JP | 2017-148018 | 8/2017 |
| JP | 2018-057340 | 4/2018 |
| KR | 10-0835557 | 6/2008 |
| KR | 20100046615 A * | 5/2010 ............... B05D 7/24 |
| KR | 10-1116332 | 3/2012 |
| KR | 10-2013-0136123 | 12/2013 |
| KR | 10-2014-0042949 | 4/2014 |
| KR | 20-0475039 | 11/2014 |
| KR | 10-2017-0003154 | 1/2017 |
| KR | 10-2017-0017718 | 2/2017 |
| KR | 10-1825334 | 2/2018 |
| KR | 10-1898661 | 9/2018 |
| RU | 2650560 | 4/2018 |
| TW | 201641007 | 12/2016 |
| TW | I 574614 | 3/2017 |
| WO | WO 2009/016604 | 2/2009 |
| WO | WO 2010/138799 | 12/2010 |
| WO | WO 2011/035320 | 3/2011 |
| WO | WO 2013/012943 | 1/2013 |
| WO | WO 2014/209159 | 12/2014 |
| WO | WO 2017/185053 | 10/2017 |

OTHER PUBLICATIONS

United States Office Action dated May 11, 2021 issued in co-pending related U.S. Appl. No. 16/571,093.
Chinese Office Action dated Mar. 30, 2021 issued in CN Application No. 201910886714.X.
United States Office Action dated Apr. 27, 2021 issued in co-pending related U.S. Appl. No. 16/569,841.
United States Office Action dated Apr. 27, 2021 issued in co-pending related U.S. Appl. No. 16/574,418.
Chinese Office Action dated May 17, 2021 issued in CN Application No. 201910889361.9.
European Search Report dated Feb. 3, 2020 issued in EP Application No. 19198170.3.
United States Office Action dated Feb. 11, 2022 issued in co-pending related U.S. Appl. No. 16/574,322.
Chinese Office Action dated May 17, 2021 issued in CN Application No. 201910887029.9.
Chinese Office Action dated May 17, 2021 issued in CN Application No. 201910889360.4.
Chinese Office Action dated May 18, 2021 issued in CN Application No. 201910888671.9.
Chinese Office Action issued in Application No. 201910888224.3 dated Apr. 12, 2021.
Chinese Office Action issued in Application No. 201910888611.7 dated Apr. 12, 2021.
Chinese Office Action issued in Application No. 201910888695.4 dated Apr. 16, 2021.
European Search Report dated Apr. 23, 2020 issued in EP Application No. 19198303.0.
European Search Report dated Feb. 3, 2020 issued in Application No. 19198173.7.
European Search Report dated Feb. 3, 2020 issued in Application No. 19198182.8.

(56) References Cited

OTHER PUBLICATIONS

European Search Report dated Feb. 3, 2020 issued in Application No. 19198183.6.
European Search Report dated Feb. 3, 2020 issued in Application No. 19198184.4.
European Search Report dated Feb. 3, 2020 issued in Application No. 19198186.9.
European Search Report dated Feb. 3, 2020 issued in Application No. 19198202.4.
European Search Report dated Feb. 10, 2020 issued in Application No. 19198265.1.
United States Office Action dated Oct. 5, 2021 issued in co-pending related U.S. Appl. No. 16/571,074.
European Search Report dated Feb. 14, 2020 issued in Application No. 19198187.7.
European Search Report dated Feb. 14, 2020 issued in Application No. 19198196.8.
European Search Report dated Feb. 19, 2020 issued in Application No. 19198191.9.
European Search Report dated Feb. 19, 2020 issued in Application No. 19198200.8.
European Search Report dated Apr. 17, 2020 issued in EP Application No. 19198180.2.
European Search Report dated Apr. 17, 2020 issued in EP Application No. 19198307.1.
European Search Report dated Apr. 20, 2020 issued in EP Application No. 19198310.5.
European Search Report dated Apr. 20, 2020 issued in EP Application No. 19198368.3.
European Search Report dated Apr. 9, 2020 issued in EP Application No. 19198174.5.
United States Office Action dated Jun. 2, 2020 issued in co-pending related U.S. Appl. No. 16/574,259.
Chinese Office Action dated May 21, 2021 issued in CN Application No. 201910888661.5.
Chinese Office Action dated May 10, 2021 issued in CN Application No. 201910888718.1.
Chinese Office Action dated Nov. 10, 2021 issued in CN Application No. 201910886714.X.
Dong, CN108464253A Machine Translation Description, Aug. 31, 2018, obtained Jan. 13, 2022 (Year: 2018).
United States Office Action dated Mar. 14, 2022 issued in co-pending related U.S. Appl. No. 16/570,310.
United States Office Action dated Mar. 17, 2022 issued in co-pending related U.S. Appl. No. 16/574,581.
United States Office Action dated Mar. 30, 2021 issued in co-pending related U.S. Appl. No. 16/571,090.
European Search Report dated Feb. 24, 2020 issued in EP Application No. 19198289.1.
Chinese Office Action dated Mar. 31, 2021 issued in CN Application No. 201910886533.7.
United States Office Action dated Aug. 29, 2022 issued in co-pending related U.S. Appl. No. 16/571,245.
Chinese Notice of Allowance dated Apr. 8, 2022 issued in CN Application No. 201910888611.7.
United States Office Action dated Jun. 23, 2022 issued in co-pending related U.S. Appl. No. 16/574,368.
United States Office Action dated Jul. 5, 2022 issued in co-pending related U.S. Appl. No. 16/574,240.
United States Office Action dated Jul. 7, 2022 issued in co-pending related U.S. Appl. No. 16/574,474.
United States Office Action dated Jul. 29, 2022 issued in co-pending related U.S. Appl. No. 16/574,322.
United States Office Action dated Sep. 19, 2022 issued in co-pending related U.S. Appl. No. 16/569,827.
United States Office Action dated May 19, 2022 issued in co-pending related U.S. Appl. No. 16/569,827.
United States Office Action dated Jun. 1, 2022 issued in co-pending related U.S. Appl. No. 16/571,075.
United States Office Action dated Jun. 15, 2022 issued in co-pending related U.S. Appl. No. 16/569,908.
Chinese Notice of Allowance dated Jul. 11, 2022 issued in CN Application No. 201910886305.X.
United States Office Action dated Oct. 13, 2022 issued in co-pending related U.S. Appl. No. 16/571,089.
Chinese Notice of Allowance dated Aug. 31, 2022 issued in CN Application No. 201910889318.2.
Chinese Office Action dated Sep. 21, 2022 issued in CN Application No. 201910888224.3.
U.S. Appl. No. 16/574,240, filed Sep. 18, 2019.
U.S. Appl. No. 16/574,312, filed Sep. 18, 2019.
U.S. Appl. No. 16/574,349, filed Sep. 18, 2019.
U.S. Appl. No. 16/571,075, filed Sep. 14, 2019.
U.S. Appl. No. 16/571,073, filed Sep. 14, 2019.
U.S. Appl. No. 16/570,310, filed Sep. 13, 2019.
U.S. Appl. No. 16/569,908, filed Sep. 13, 2019.
Chinese Office Action dated Apr. 1, 2021 issued in CN Application No. 201910886305.X.
Chinese Office Action dated Apr. 9, 2021 issued in CN Application No. 201910886526.7.
United States Office Action dated Dec. 6, 2021 issued in co-pending related U.S. Appl. No. 16/569,827.
United States Office Action dated Dec. 10, 2021 issued in co-pending related U.S. Appl. No. 16/571,075.
Rao et al. (2015). Effect of Corrugation Angle on Heat Transfer Studies of Viscous Fluids in Corrugated Plate Heat Exchangers. International Journal of Engineering and Technology Innovation, 5(2), pp. 99-107. (Year: 2015).
United States Office Action dated Feb. 23, 2023 issued in co-pending related U.S. Appl. No. 16/574,322.
United States Office Action dated Mar. 3, 2023 issued in co-pending related U.S. Appl. No. 16/574,474.
European Search Report dated Feb. 27, 2020 issued in Application No. 19198292.5.
European Search Report dated Feb. 27, 2020 issued in Application No. 19198298.2.
Chinese Office Action dated Feb. 13, 2023 issued in Application No. 202210573950.8.
U.S. Appl. No. 16/574,237, filed Sep. 18, 2019.
Chinese Office Action issued in Application No. 201910887007.2 dated Apr. 20, 2021.
Chinese Office Action issued in Application No. 201910886974.7 dated Apr. 20, 2021.
Chinese Office Action issued in Application No. 201910886711.6 dated Apr. 20, 2021.
Chinese Office Action issued in Application No. 201910889081.8 dated Apr. 20, 2021.
Chinese Office Action issued in Application No. 201910888688.4 dated Apr. 21, 2021.
Chinese Office Action issued in Application No. 201910886539.4 dated Apr. 22, 2021.
Chinese Office Action issued in Application No. 201910889318.2 dated Apr. 22, 2021.
Chinese Office Action issued in Application No. 201910888721.3 dated Apr. 22, 2021.
Chinese Office Action issued in Application No. 201910888102.4 dated Apr. 26, 2021.
U.S. Office Action dated Apr. 27, 2023 issued in U.S. Appl. No. 16/574,581.
United States Office Action dated Mar. 24, 2022 issued in co-pending related U.S. Appl. No. 16/571,089.
U.S. Office Action dated May 24, 2023 issued in U.S. Appl. No. 16/571,074.
U.S. Appl. No. 16/574,219, filed Sep. 18, 2019.
U.S. Appl. No. 16/574,237, filled Sep. 18, 2019.
U.S. Appl. No. 16/574,322, filed Sep. 18, 2019.
U.S. Appl. No. 16/574,368, filed Sep. 18, 2019.
U.S. Appl. No. 16/574,474, filed Sep. 18, 2019.
U.S. Appl. No. 16/574,581, filed Sep. 18, 2019.
U.S. Appl. No. 16/571,245, filed Sep. 16, 2019.
U.S. Appl. No. 16/571,093, filed Sep. 14, 2019.
U.S. Appl. No. 16/571,089, filed Sep. 14, 2019.

(56) References Cited

OTHER PUBLICATIONS

U.S. Appl. No. 16/571,076, filed Sep. 14, 2019.
U.S. Appl. No. 16/571,074, filed Sep. 14, 2019.
U.S. Appl. No. 16/570,279, filed Sep. 13, 2019.
U.S. Appl. No. 16/569,827, filed Sep. 13, 2019.
U.S. Office Action dated Mar. 30, 2023 issued in U.S. Appl. No. 16/574,368.
U.S. Office Action dated Jun. 29, 2023 issued in U.S. Appl. No. 16/574,322.

* cited by examiner

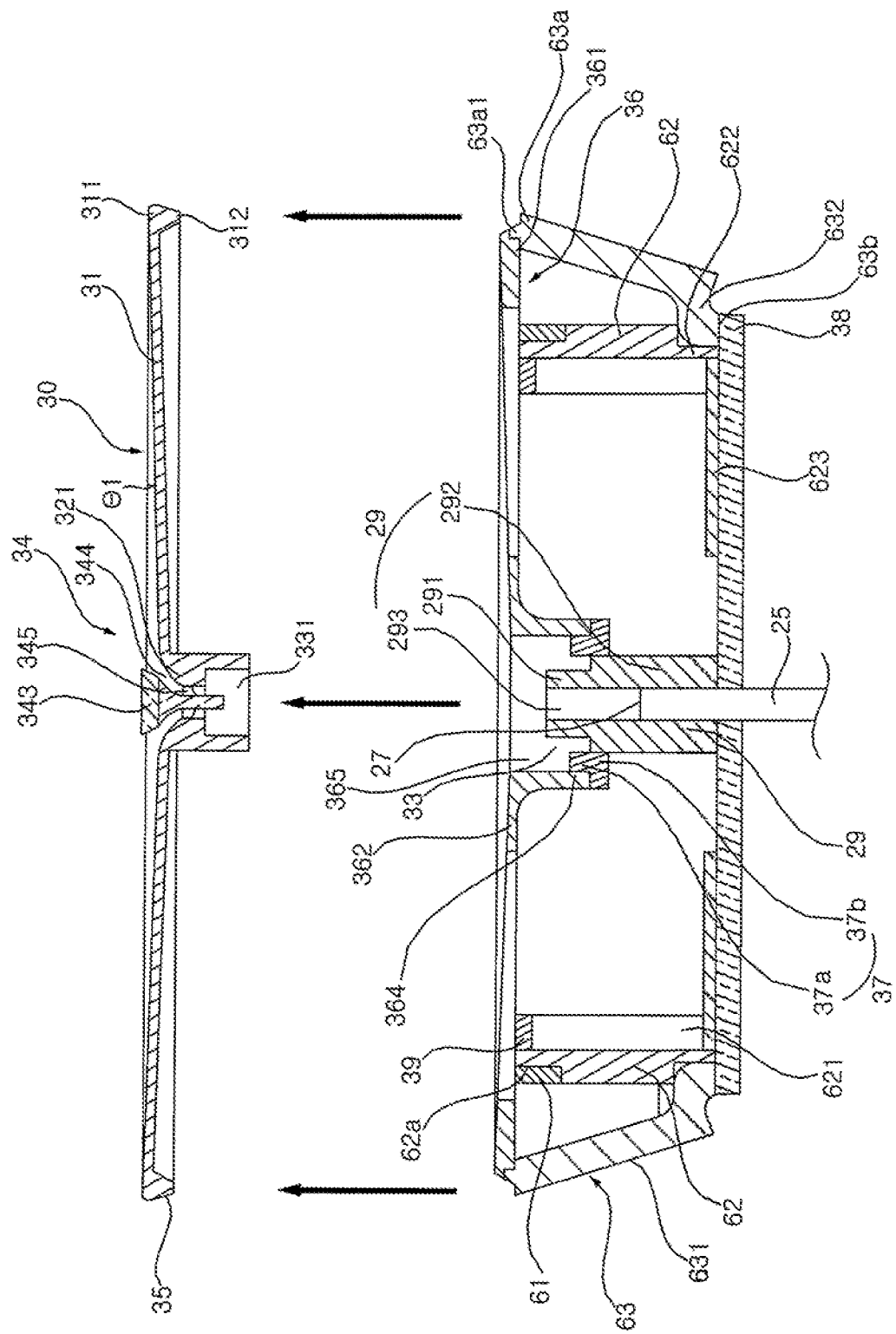

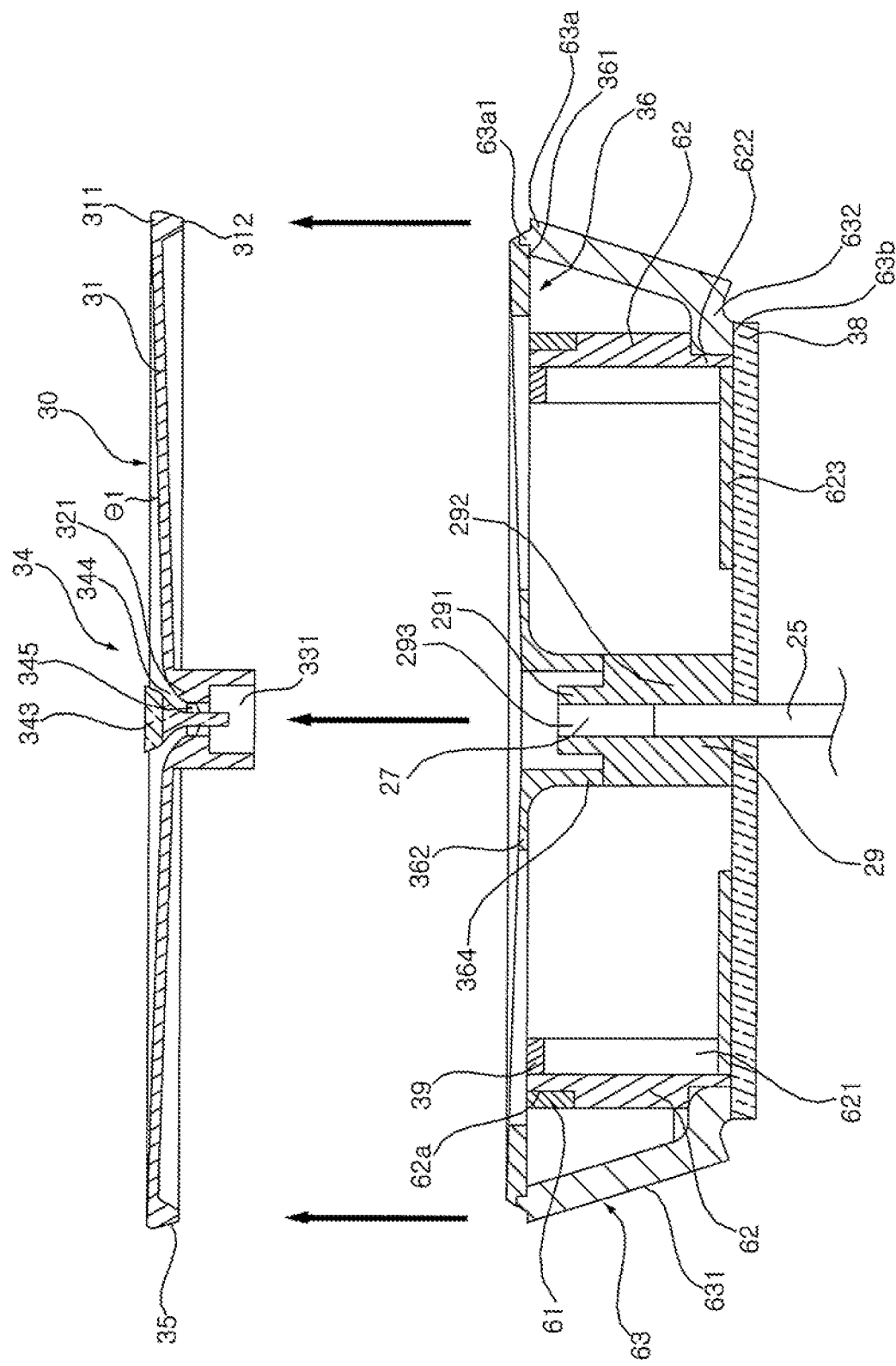

LIQUID DISPENSER FOR ANIMALS

CROSS-REFERENCE TO RELATED APPLICATION(S)

This application claims priority under 35 U.S.C. § 119 to U.S. Provisional Application No. 62/733,393 filed on Sep. 19, 2018 and Korean Application Nos. 10-2019-0059513 filed on May 21, 2019, 10-2018-0132643 and 10-2018-0132645 filed on Nov. 1, 2018, whose entire disclosure(s) is/are hereby incorporated by reference.

BACKGROUND

1. Field

A liquid dispenser to supply liquid to an animal, e.g., a pet, is disclosed herein.

2. Background

In recent years, the population of people raising a pet has increased, in addition attachment and interest pets. Like most animals, pets must drink water to survive and maintain a biorhythm. Since pets are often left alone and since communication with their owners is difficult, the demand for pet water dispensers or water supply devices has increased.

Flowing or moving water typically has a larger surface area in contact with outside air than water stored in a bowl or container, so flowing water may contain more oxygen than still water. Many pets are known to prefer fresh flowing water over still water in a bowl because moving water contains more oxygen. Accordingly, there is a need for a water dispenser that provides flowing water.

US Publication Nos. 2010/0095897 and 2014/0053781, EP Patent No. 3315022, and KR Patent No. 10-1825334 B1 disclose drinking bowls for pets. However, such drinking bowls have various disadvantages which the present disclosure solves.

The above references are incorporated by reference herein where appropriate for appropriate teachings of additional or alternative details, features and/or technical background.

BRIEF DESCRIPTION OF THE DRAWINGS

FIG. 7 is a cross-sectional view of the illumination assembly shown in FIG. 5 with the water supply plate removed;

FIGS. 10, 11A, 11B, 12A, 12B, 13A, and 13B are sectional views showing how the water supply plate may be separated and attached in various ways;

DETAILED DESCRIPTION OF THE INVENTION

Figure 1:
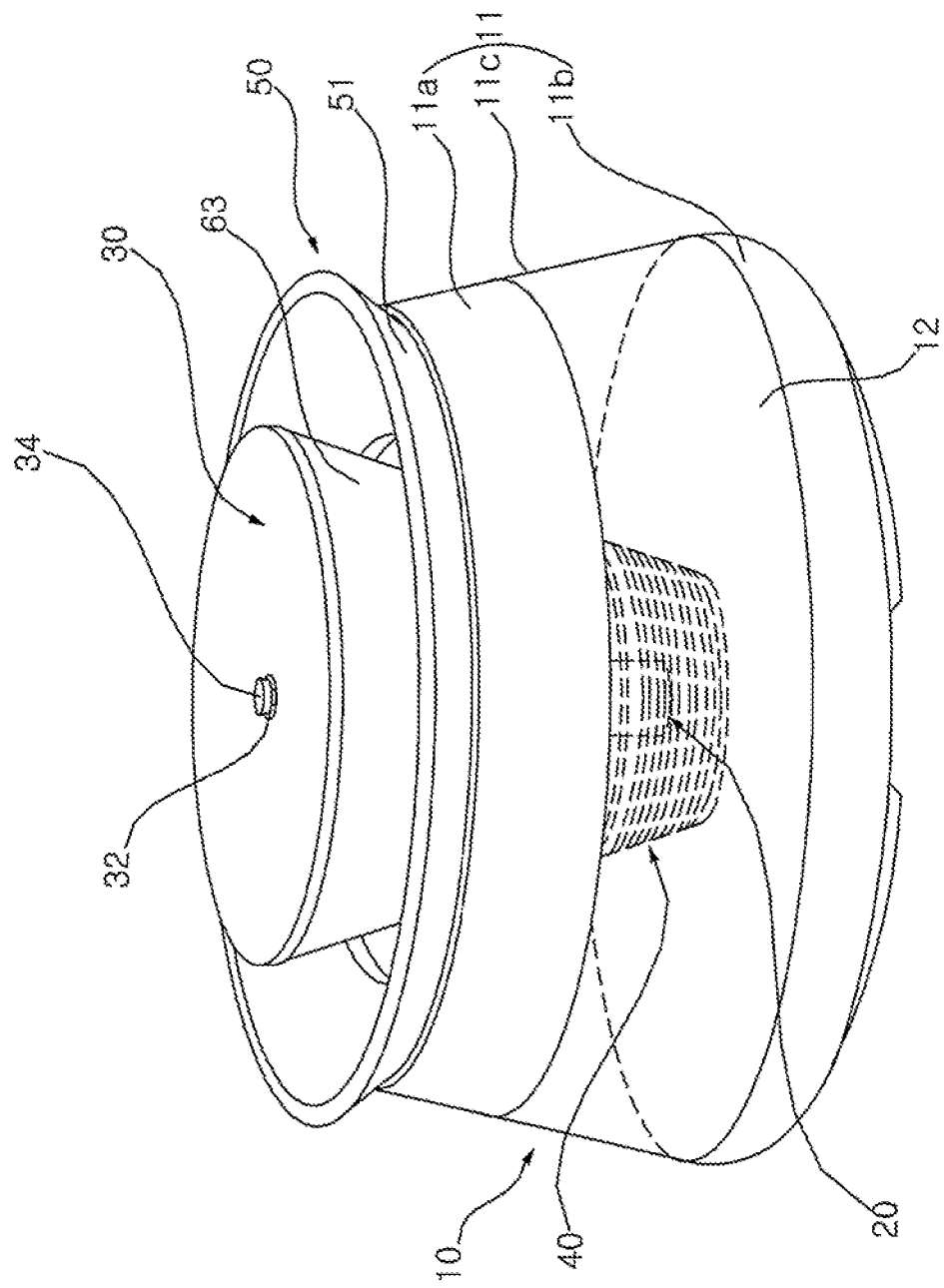
FIG. 1 is a perspective view of a pet water dispenser according to an embodiment.
Figure 2:
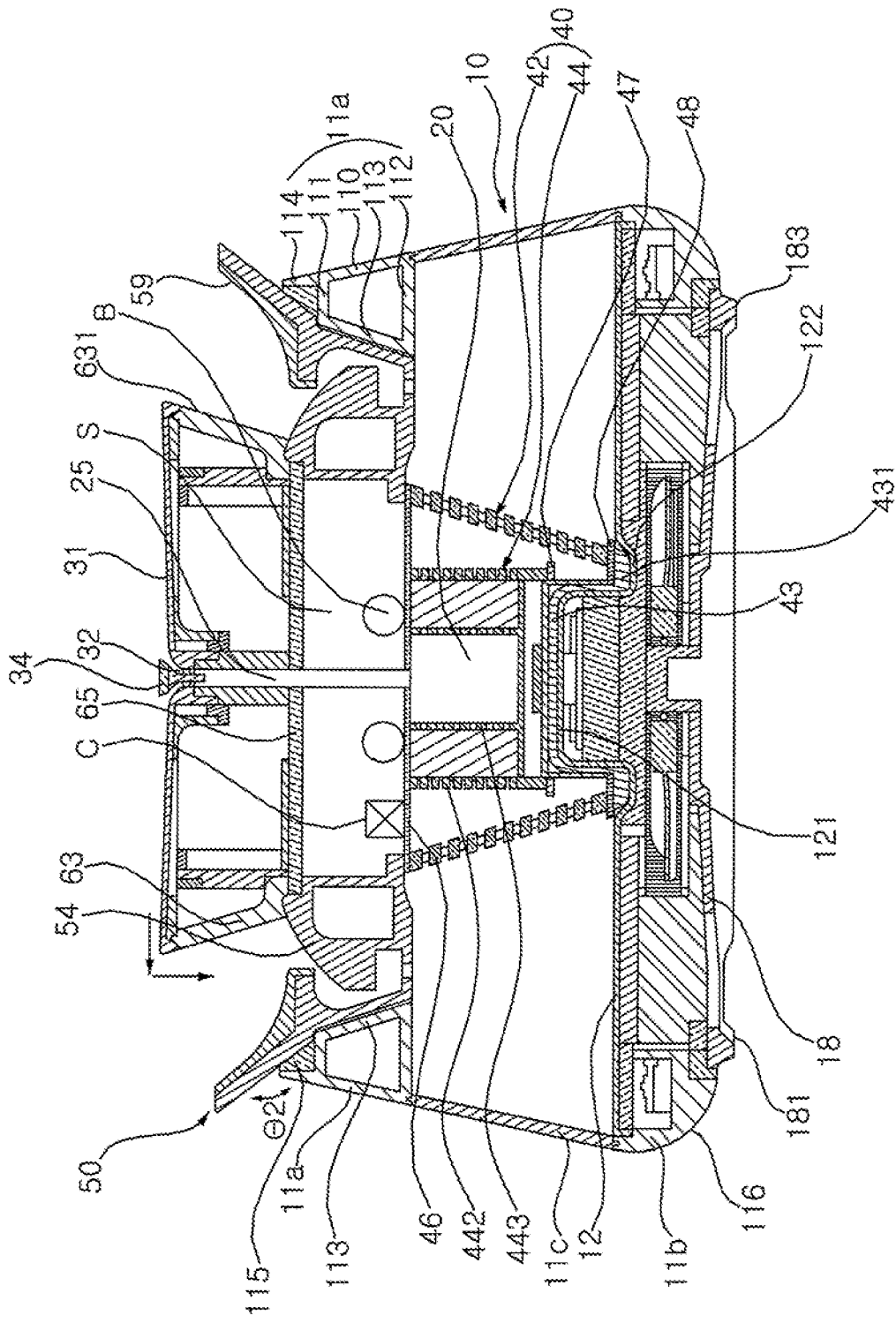
FIG. 2 is a cross-sectional view of the pet water dispenser shown in FIG. 1.

Referring to FIGS. 1-2, the pet water dispenser according to an embodiment may supply water stored in a water tank or storage chamber 10 to a water supply plate or upper plate 30 through a pump 20 and water supply pipe 25, and the water supplied to the water supply plate 30 may be circulated back to the water tank 10 via a water guide or a water receiver 50. The water guide 50 may also be referred to as a drip tray or splash guard.

An upper side or top of the water tank 10 may be opened, and the pump 20 may be provided inside the water tank 10. The pump 20 may be formed in a removable insert assembly, or alternatively, may be rigidly fixed in the water tank 10. The water supply plate 30 may be provided above and spaced apart from the water tank 10, and a water supply hole 32 communicating with the water supply pipe 25 may be formed in the water supply plate 30.

A filter or filter assembly 40 may be installed in the water tank 10 to filter foreign substances contained in the water before the water stored in the water tank 10 flows into the pump 20. An illumination assembly 60 having a light device 61 (FIG. 10) may be provided under the water supply plate 30 to support the water supply plate 30. The water guide 50 may be provided between the water tank 10 and the water supply plate 30 to receive water dropped from the water supply plate 30 and to guide the water to the water tank 10. The water guide 50 may be arranged to be spaced apart from the water supply plate 30, and the illumination assembly 60 may be provided between the water supply plate 30 and the water guide 50. The pet water dispenser may also include a power supply device or assembly, a water level sensor, a water temperature sensor, a proximity sensor 87, a pollution or contamination level sensor, and a water temperature maintenance device. Details of the illumination assembly 60 will be described later with reference to FIG. 10.

Referring to FIG. 1, the water tank 10 may include a wall 11 opened at a top and bottom to form a side edge of the water tank 10. The wall 11 may include a main wall 11c, an upper wall 11a, and a container support 11b coupled to upper and lower ends of the main wall 11c, respectively. A bottom plate 12 may be provided between the main wall 11c and the container support 11b to separate a water storage space above the bottom plate 12 from a dry space below the bottom plate 12 where electronic devices may be stored.

The main and upper walls 11c and 11a may form a container of the water tank 10 where water is primarily stored, and the container support 11b may form a container base. The main and upper walls 11c and 11a may be formed together in a cylindrical shape or truncated cone shape having a receding diameter from the bottom plate 12 to a top of the upper wall 11a, but may be formed in various shapes without being limited thereto. When the diameters of the main and upper walls 11c and 11a are tapered upward to lower a center of mass of the water tank 10, overturning of the water tank 10 may be prevented even when a considerable external impact is applied to the water tank 10.

The upper wall 11a may be formed to extend upward from the main wall 11c. A first protruding plate 111 and a second protruding plate 112 may be provided to protrude toward a center of the water tank 10 from an inner surface of the upper wall 11a. The first and second protruding plates 111 and 112 may be spaced apart from each other in a vertical direction of the water tank 10, while the first and second protruding plates 111 and 112 may extend in a horizontal direction or in a direction parallel to an upper surface of the bottom plate 12. The second protruding plate 112 may be formed so as to protrude further inward than the first protruding plate 111 and may have a length longer than a length of the first protruding plate 111.

An inner inclined surface or inner tank wall 113 may extend between inner ends of the first and second protruding plates 111 and 112. The inner tank wall 113 may be inclined inward toward the center of the water tank 10 from a top end to a bottom end. Lengths and positions of the first and second protruding plates 111 and 112 may be configured to set an inclination of the inner tank wall 113.

A wall portion or outer tank wall 110 of the upper wall 11a may extend upward in a same direction as the main wall 11c and project upward from the main wall 11c. An inclination of the outer tank wall 110 may be equal to an inclination of the main wall 11c. Alternatively, the outer tank wall 110 may be extended or protruded so as to be widened or narrowed more gradually than the main wall 11c. In such a case, the inclination of the outer tank wall 110 may be different from the inclination of the main wall 11c.

The upper wall 11a may be formed with an upward protruding wall or extension 114 protruded upward from in outer end of the first protrusion 111 and/or a top end of the outer tank wall 110. A bumper 115 (e.g., a rubber or elastic material) may be attached on an inner surface of the extension 114 and/or an upper surface of the first protrusion 111 so that the water guide 50 to be described later may be mounted on the upper wall 11a so as to contact the bumper 115. The bumper 115 may be a packing or cushioning.

A tubular convex protrusion or protrusion 121 may be formed at a center of the bottom plate 12 so as to extend upward. The protrusion 121 may be hollow such that there is an inner space under the bottom plate 12. The bottom plate 12 may be integrally formed with the wall 11, or the bottom plate 12 and wall 11 may be separately formed and coupled to each other. A ring-shaped groove or recess 122 may be formed on the bottom plate 12 around the protrusion 121.

The main wall 11c, the upper wall 11a, and the container support 11b may be integrally made of the same material, or alternatively they may be made separately and later combined with each other. The upper wall 11a and the container support 11b may be manufactured from various materials to provide aesthetic appeal (e.g., stainless steel or pigmented plastic). The main wall 11c may be made of a transparent material (e.g., glass or plastic) so that a water level in the water tank 10 may be easily viewed. In addition, the bottom plate 12 may be an opaque material (e.g., stainless steel or pigmented plastic) to shield a view of electronic devices or sensors (e.g., a proximity sensor 87) provided in the container support 11b, and/or may be made of a material having high thermal conductivity (e.g., metal such as stainless steel) so that a water temperature sensor provided below the bottom plate 12 may accurately sense a temperature of the water stored in the water tank 10.

Protrusions may be formed on upper and lower ends of the main wall 11c that are inserted into grooves or recesses formed on a lower end of the upper wall 11a and an upper end of the lower wall 11c, respectively. Alternatively, the upper wall 11a, container support 11b, and main wall 11c may be fused, welded, or bonded for integration.

The container support 11b may have an outer circumferential surface 116 that curves downward from a lower edge of the main wall 11c to have a concave curvature. At least one sensor (e.g., a water level sensor or a proximity sensor 87) may be installed or provided in a space under the bottom plate 12 on an inner side of the container support 11b.

An edge of the bottom plate 12 may be formed with a bent portion or lower extension 123 bent downward from a main surface of the bottom plate 12. The extension 123 of the bottom plate 12 and the inner surface of the container support 11b may be integrally joined (e.g., welded, bonded, or fused). A top surface of the bottom plate 12 may be at a same height as the top end of the container support 11b. A coupling between the bottom plate 12 and the container support 11b may be secure enough to prevent water from seeping into a space below the bottom plate 12.

A base plate 18 may be provided below and spaced apart from the bottom plate 12 to cover an opened bottom of the container support 11b. At least one sensor or device (e.g., water temperature sensor or a thermoelectric element 81) may be installed in a space formed between the container support 11b, the base plate 18 and the bottom plate 12.

The filter assembly 40 may include a first filter 42 and a second filter 44. The first filter 42 may be formed in a cylindrical or truncated cone shape and may be formed of a rigid material (e.g., stainless steel). A plurality of water inlets or through holes may be formed in a wall of the first filter 42 to filter foreign matter having a particle size larger than a size of each of the through holes. The first filter 42 may be a truncated (conical) strainer having a radius that increases from a bottom to a top.

The first fitter 42 may include a lower filter cover or cap 43 provided on the bottom of the first filter. The lower filter cover 43 may be formed separately and later combined with the first filter 42, or alternatively may be formed as a single body with the first filter 42. The lower filter cover 43 may be inserted into a support cylinder, which may be coupled to a bottom of the second filter 42. An inner surface of the lower filter cover 32 may be configured to have a shape that corresponds to an outer surface contour of the protrusion 121.

The lower filter cover 43 may be formed to be convex upward or in a hollow cylinder shape so as to cover the protrusion 121 formed on the bottom plate 12. An inner surface of the lower filter cover 43 may be configured to correspond to an outer surface of the protrusion 121. The lower filter cover 43 may have a flange 431 extending from a bottom edge which may be inserted into the groove 122 formed around the protrusion 121. The lower filter cover 43 may stably maintain a predetermined position of the first filter 42 to prevent horizontal or lateral movement of the first filter 42 in the water tank 10.

The filter assembly 40 may surround the pump 20. The second filter 44 may be provided in a hollow portion inside the wall of the first filter 42. The pump 20 may be installed in an inner space of the second filter 44. When the pump 20 is installed in an inner space of the first filter 42 or the second filter 44, a filtration performance may be improved as compared with a case where the filter assembly 40 is provided on one side of the pump 20. Further, a separate structure to fix or maintain the pump 20 at a predetermined position is not required because the filter assembly 400 may be configured to support the pump 20 and maintain the pump 20 in the predetermined position.

The second filter 44 may include an outer wall 442 formed with a plurality of through holes and an inner wall 443 spaced from the outer wall 422 also having a plurality of through holes. A space formed between the inner and outer walls 442 and 443 may be filled with a filtration material 45 (e.g., carbon filter).

The pump 20 may be installed or located in a hollow portion formed inside the inner wall 443 of the second filter 44. The water that has passed through the plurality of through holes of the first filter 42, the outer wall 442, and the filtration material 45 may be sucked into the pump 20 through the through holes formed in the inner wall 443 and discharged to the water supply pipe 25.

The pump 20 may include a motor therein. The motor may be a motor whose rotational speed may be varied. A control module or controller C, which will be described later, may control a rotation speed of the motor so as to vary the pumping capacity or rate of the pump 20 to pump the water stored in the water tank 10. When a large number of pets drink water at the same time, the controller C may determine such a large number based on information from the proximity sensor 87, and may speed up the rotation speed of the motor to increase the pumping capacity or rate of the pump 20. The controller C may also control the pump 20 based on a command from the user.

An upper filter cover 46 may be provided on upper ends of the first and second filters 42 and 44. The water supply pipe 25 may pass through the upper filter cover 46. The upper fitter cover 46 may seal upper ends of the pump 20 and the first and second filters 42 and 44. The first and second filter filters 42 and 44 and the upper filter cover 46 may be coupled to each other by a method such as adhesion or fusion. Alternatively, the first and second filter filters 42 and 44 and the upper filter cover 46 may be assembled to be detachable from each other by a known engaging means such as an arm, hook structure, or screw structure.

At least one of the first and second filters 42 and 44 may be optional. Alternatively, a third, fourth, etc. filter may be included. Further details of the filter assembly 100 may be found in U.S. application Ser. No. 16/571,073 filed on Sep. 14, 2019 and U.S. application Ser. No. 16/570,310 filed on Sep. 13, 2019, the entire contents of which are incorporated by reference herein.

Figure 3:
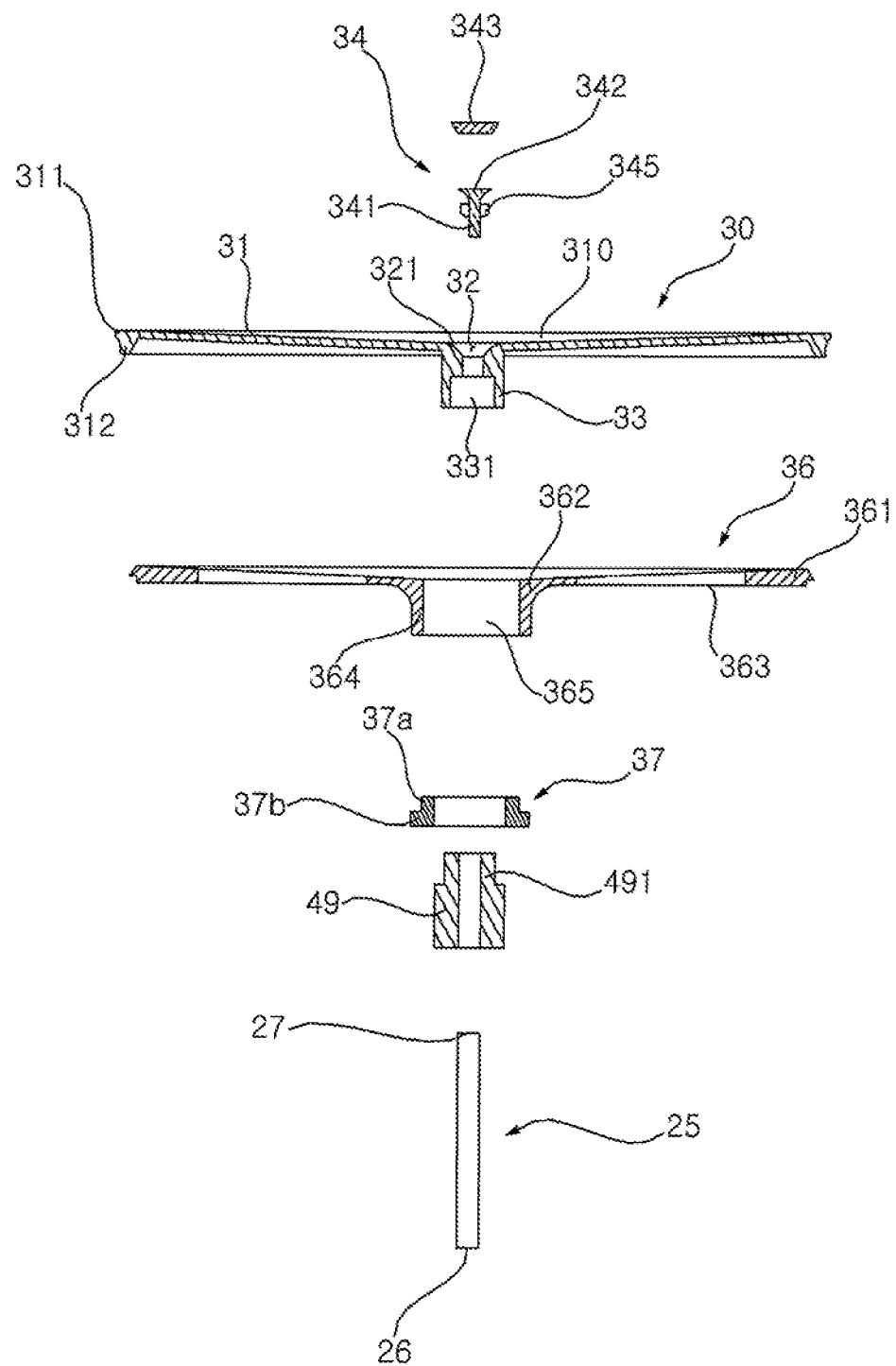
FIG. 3 is an exploded sectional view showing a water supply plate, a plug, a plate support or plate frame, a water supply pipe, and ta water outlet shown in FIG. 2.
Figure 5:
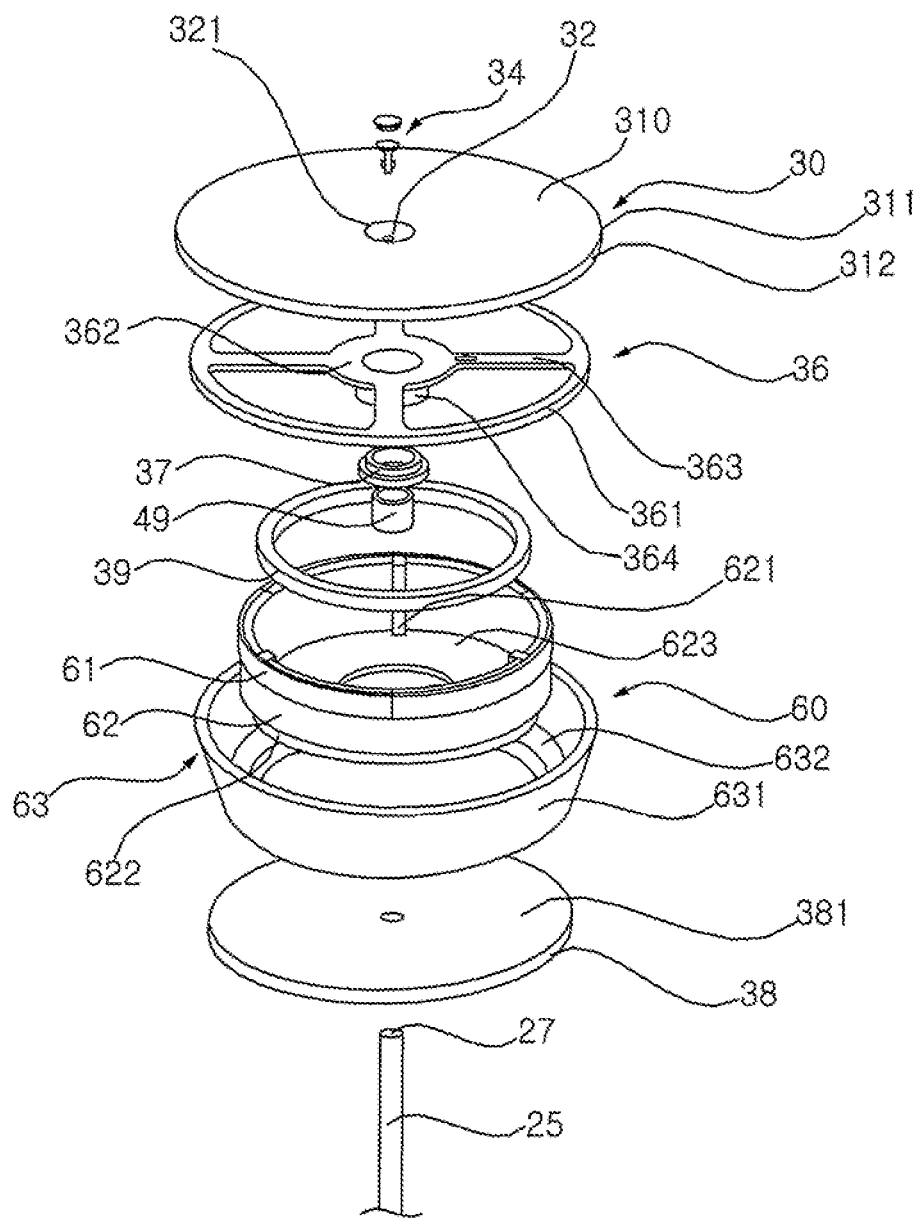
FIG. 5 is an exploded perspective view of the configuration shown in FIG. 3 and an illumination assembly.

Referring to FIGS. 2, 3 and 5, the water supply pipe 25 may be arranged in a vertical direction of the water tank 10 and may have a water inlet 26 at a lower end and a water outlet 27 at an upper end. The water discharged from the pump 20 may flow into the water supply pipe 25 through the water inlet 26 and may be discharged through the water outlet 27.

Referring to FIG. 3, the water supply plate 30 may have a water supply hole 32 formed at a center, and a plate body or upper surface 31 connecting edges 311 of the water supply plate 30. A first boss 33 may be formed on a lower surface of the water supply plate 30 to protrude downward. The water supply hole 32 may extend through the first boss portion 33 and a communicate with a hole 331 to be described later. The water supply hole 32 may include a trumpet or upper portion 321 having a trumpet head shape that has an increasing diameter from a lower or stem portion of the water supply hole 32 up to an upper surface 310 of the plate body 31. An edge protrusion 312 may protrude downward below the edge 311 on the lower surface of the water supply plate 30 to create a groove or recess in which a plate support or frame 36 may be inserted. The plate support 36 may also be referred to as a support plate 36.

The plate body 31 may be formed of a plate having the upper surface 310, which may be flat. The water supplied to the water supply plate 30 through the water supply hole 32 may flow over the upper surface 310 of the plate body 31 to the edge 311 of the water supply plate 30.

Embodiments disclosed herein are not limited to a flat upper surface 310. For example, the plate body 31 may be sloped upward such that the upper surface 310 may have a constant upward slope or may have a concave curvature to facilitate a collection of water. As another example, the plate body 31 may be sloped downward such that the upper surface 310 may have a constant downward slope or may have a convex curvature to facilitate a downward flow of water.

Various patterns and designs may be formed on the upper surface 310. For example, the upper surface 310 of the plate body 31 may include a rib or micro-projection 315 (FIG. 8), which will be described later. The edge 311 of the water supply plate 30 may be protruded or recessed from the upper surface 310 of the plate body 31, and the upper surface 310 itself may have protrusions (different from ribs 315) or recesses to form various patterns such as a wave pattern.

Figure 4:
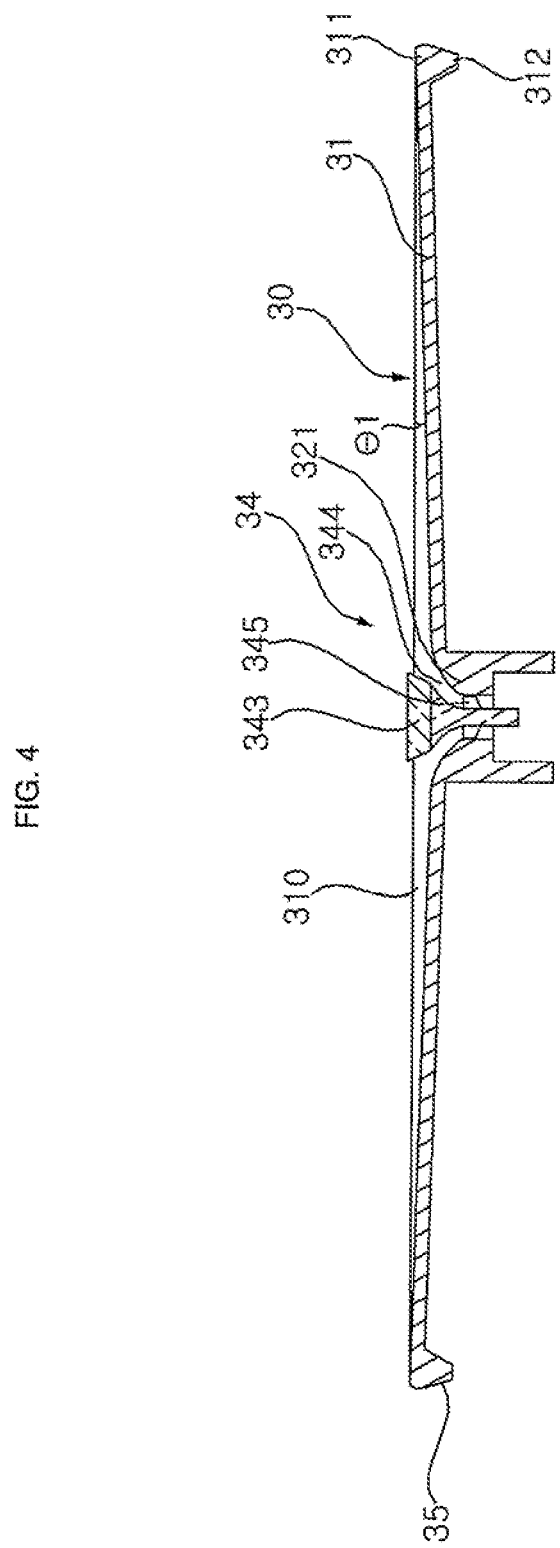
FIG. 4 is a cross-sectional view of the water supply plate shown in FIG. 3

Referring to FIG. 4, the upper surface 310 may be inclined upward from the water supply hole 32 toward the edge 311 of the water supply plate 30. The upper surface 310 may be inclined upward while maintaining a constant inclination from the water supply hole 32 toward the edge 311.

The plate body 31 may be formed as a plate having a constant thickness. The plate body 31 may be inclined upward from the water supply hole 32 toward the edge 311. The plate body 31 may be inclined upward while maintaining a constant inclination from the water supply hole 32 toward the edge 311. A predetermined plate angle $\Theta 1$ may be formed between an imaginary horizontal line or plane extending from the edge 311 and the upper surface 310 of the plate body 31. The predetermined plate angle $1l$ may be an acute angle. Accordingly, the upper surface 310 may be inclined upward from the water supply hole 32 toward the edge 311, and such an inclination may be constant so as to form a line angled from the edge 311 by the predetermined plate angle 91.

The predetermined plate angle $\Theta 1$ may be greater than 0 degrees and less than 45 degrees so that water supplied to the water supply plate 30 flows toward the edge 311. The upper surface 310 of the plate body 31 may be gradually inclined upward from the water supply hole 32 toward the edge 311 so that the water supplied through the water supply hole 32 does not have a tendency to collect and may more easily flow off the edge 311 with a great speed or propulsion.

For example, the predetermined plate angle $\Theta 1$ may be about 2 degrees (as exemplified in FIG. 4). Water flowing along the upper surface 310 of the plate body 31 may maintain constant thrust in a horizontal direction toward the edge 311. When the water flowing over the water supply plate 30 overflows from the edge 311 by a propulsion of the water, water may fall downward from the edge 311. Accordingly, the pet water dispenser may supply a large amount and area of falling water to a pet.

In contrast, conventional water dispensers (e.g., KR10-1825334 B1) may supply water to a container in the form of a bowl, and the bowl may be more inclined toward an edge to have a concave curvature. The water supplied to the bowl loses its propulsion toward an edge of the bowl, and flow or spillage may occur in any direction from the bowl. Some of the water supplied to the bowl may be stored in the bowl for a long time without overflowing or circulating through the supply system, getting dirty. Also, as the water overflows from the bowl, the water may not have enough propulsion to flow directly downward from the bowl and may instead spill downward along an outer edge of the bowl, making consumption difficult.

Further, in another case of a conventional water dispenser (e.g., EP3315022 A1) in which the container to which the water is supplied is inclined downward, water rapidly flows on a circular drainage surface or functional insert, and the depth of the flowing water becomes shallow. When shallow, it is not easy for the pet to consume water.

The water supply plate 30 may have an outer peripheral surface or side surface 35 extending between the edge 311 and the edge protrusion 312. The outer circumferential surface 35 may be inclined inward from the edge 311 downward toward the edge protrusion 312.

An outer side surface 631 of a support 63, which will be described later with reference to FIG. 6, may be positioned below the outer circumferential surface 35 and may have a same or similar inclination as an inclination of the outer circumferential surface 35 to create a seamless coupling between an upper surface of the support 63 and the edge protrusion 312. The support 63 may serve as a light diffuser and may also be referred to as a light guide or light guide plate. The outer circumferential surface 35 and the outer surface 631 of the support 63 may be inclined toward a center of the water tank 10 from top ends to bottom ends. The support 63 may also be a light guide.

Water leaving the edge 311 of the water supply plate 30 may be dropped or cascaded vertically toward the water tank 10 without flowing along the outer peripheral surface 35 and the outer surface 631. Alternatively, a pumping capacity or rate of the pump 20 and/or a shape of the water supply plate 30 may be configured to encourage water to spill over the edge 311 and flow along the outer peripheral surface 35 and the outer surface 631.

An outer surface of the edge protrusion 312 may at least partially form the outer circumferential surface 35 of the water supply plate 30. The outer surface of the edge protrusion 312 may be inclined toward the center of the water tank 10.

A lower side and a lower end of the edge protrusion 312, along with a bottom surface of the plate support 36, may contact an upper end of the support 63, which will be described later with reference to FIG. 6. An inner circumferential surface of the edge protrusion 312 may be in contact with an outer circumferential surface of the plate support 36. An upward projection 63a1 formed on the top end of the support 63 (FIGS. 6-7) may be provided between a step portion formed in an outer edge of the plate support 36 and the inner circumferential surface of the edge protrusion 312.

Referring back to FIG. 3, the pet water dispenser may include a nozzle stopper or plug 34 which may be at least partially inserted into the water supply hole 32. The plug 34 may be configured to prevent water from rising too high above the water supply plate 30, and may further encourage water discharged from the water supply hole 32 to spread in a ring or fountain shape. Alternatively, the plug 34 may be a float which moves up and down based on water flowing out of the water outlet 27 of the water supply pipe 25, and the float may completely close the water supply hole 32 when the pump 20 is turned off.

The plug or float 34 may serve as a diverter. A diameter of an upper portion or head 342 of the plug 34 may be larger than a diameter of the water supply hole 32. The head 342 of the plug 34 may be provided higher than the edge 311 of the water supply plate 30. The head 342 may prevent the water supplied through the water supply hole 32 from rising upward and instead deflect the water to smoothly flow toward the edge 311 of the water supply plate 30.

The plug 34 may include a stem 341 at least partly inserted into the water supply hole 32, a plurality of circumferentially spaced ribs 345 projecting outwardly of the stem 341, and the head 342 formed above the stem 341. The head 342 may be formed with a head cover 343. Hereinafter, an "upper portion" of the plug 34 may include both the head 342 and the head cover 343.

The stem 341 of the plug 34 may be inserted into the water supply hole 32 such that the head 342 and the head cover 343 are spaced apart from the water supply hole 32. The ribs 345 may prevent the stem 341 from being fully inserted into the water supply hole 32. Alternatively, the ribs 345 may be captured within the water supply hole 32. The water supply hole 32 may include grooves to allow the ribs 345 to move up and down based on water being pumped when the plug 34 serves as a float.

Referring to FIG. 4, a water outlet 344 may be formed between the upper portion of the plug 34 and the water supply plate 30 in the water supply hole 32. As an example, the water outlet 344 may be formed in a ring shape between a periphery of the upper portion 321 of the water supply hole 32 and the head cover 343.

The stem 341 of the plug 34 may be inserted into the water supply hole 32 at a bottom end, and the water outlet 27 of the water supply pipe 25 may communicate with the water supply hole 32. The rib 345 may contact an inner surface of the water supply hole 32 to support the plug 34 in a predetermined position in the water supply hole 32. Alternatively, the rib 345 may protrude from an inner surface of the water supply hole 32 or of the first boss 33, and the stem 341 may be held in contact with or supported by the rib 345.

A diameter of the stem 341 may be smaller than a diameter of the water supply hole 32 and the first boss 33. The head 342 may be formed at an upper end of the stem 341 and may have a diameter that increases from a bottom to a top. A diameter of an upper end of the head 342 may be larger than a diameter of a lower portion of the water supply hole 32. The head cover 343 may be provided at the upper end of the head 342 and may also have an increasing diameter from a bottom to a top. An upper diameter of the head cover 343 may be larger than a diameter of the water supply hole 32. The plug 34 may be provided such that at least a part of the head cover 343 may be higher than the upper surface 310.

Water discharged in a vertical direction from the water outlet 27 may have a momentum component in the vertical direction and a momentum component in a horizontal direction due to the upper portion 321 of the water supply hole 32 and the head 342 and the head cover 343. The water supplied through the outlet 344 may be ejected in a ring shape and flow along the upper surface 310 toward the edge 311 of the water supply plate 30. The water flowing along the upper surface 310 may maintain the horizontal momentum component and may fall vertically from the edge 311 because the slope of the upper surface 310 is constant.

Even when the plug 34 is provided on the upper side of the water supply plate 30, the upper surface 310 of the water supply plate 30 may be exposed to an outside, as diameters of the head 342 and head cover 343 may be smaller than a diameter of the upper surface 310. In addition, a diameter of at least one of the head 342 and the head cover 343 may be smaller than a diameter of the upper portion 321 of the water supply hole 32 and/or an outer diameter of the first boss 33.

The water supply plate 30 may be provided at a higher position than a position of the water tank 10, and the upper surface 310 of the water supply plate 30 may be exposed to an outside of the water tank 10. Accordingly, the pet may drink water flowing along the upper surface 310, as well as the water falling from the water supply plate 30.

The plug 34 may be configured in various manners and shapes, and structures of the head 342, the stem 341, the ribs 345, and the inner surface of the water supply hole 32 may be varied to change a flow of the water from the water supply hole 32 out to the edge 311 of the water supply plate 30. For example, the plug 34 may be inserted in a hole other than the water supply hole 32, or the plug 34 may include a spoke extending radially from the head 342 to couple to the edge 311 of the water supply plate 30. As previously mentioned, the water supply plate 30 may include a rib 315 protruding radially from the upper surface 310 (see FIG. 8).

Referring back to FIG. 3, the plate support 36 may be provided below the water supply plate 30 to support the water supply plate 30. A sealing ring 37, which may be an elastic body or member formed of an elastic material (e.g., rubber), may connect the water supply plate 30 and the plate support 36. The sealing ring 37 may also be referred to as a packing ring. The water supply plate 30 may be detachably seated on the plate support 36.

The first boss 33 may be inserted into a hub ring 362 and a second boss 364 formed in the plate support 36. The first boss 33 may be formed with a hole 331 extending downward from the water supply hole 32. An outflow portion or coupler 29 (FIG. 10) through which the water supply pipe 25 is inserted may communicate with the hole 331 formed in the first boss 33.

Referring to FIGS. 3 and 5, the plate support 36 may include an outer ring 361 that abuts against the edge protrusion 312 of the water supply plate 30, and the hub ring 362 located at a center. A plurality of spokes 363 may extend between the hub ring 362 and the outer ring 361.

The second boss 364 may protrude downward from the hub ring 362. The first boss 33 may be inserted into a hole 365 formed in the second boss 364. The sealing ring 37 may be forcibly inserted between the second boss 364 and the first boss 33. A light base or support 62 and a light diffuser or plate support wall 63 to be described later may be provided below the plate support 36 to support the plate support 36.

The sealing ring 37 may be at least partially press-fitted between the first boss 33 and the second boss 364 to couple the water supply plate 30 and the plate support 36 together. The sealing ring 37 may have a hole or opening at its center. The first boss 33 may be at least partially press-fitted into the hole formed in the sealing ring 37 and inserted into the second boss 364. The first boss 33 and the second boss 364 may be coupled by an elastic force of the sealing ring 37.

The sealing ring 37 may include an upper portion or narrow end 37*a* which is press-fitted between the first boss 33 and the second boss 364. The sealing ring 37 may have a lower portion or wide end 37*b* having an outer diameter larger than an outer diameter of the upper portion 37*a*. The sealing ring 37 may support a bottom of the second boss 364 via the lower portion 37*b*.

The water supply pipe 25 may penetrate through a partition plate 38 provided below and spaced apart from the plate support 36, and the outlet 27 may communicate with the lower portion of the water supply hole 32. Either the hole of sealing ring 37 or a separate outflow member or coupler 29 may form an outflow passage 293 (FIG. 6), or an optional UV (ultraviolet) filter or light 49 may be inserted into the hole 331 of the first boss 33, which is provided within the hole of the sealing ring 37, and have a hole to form the outflow passage 293. The UV filter 49 may be a sterilizing filter to sterilize water discharged from the water outlet 27. The UV filter may include a UV LED (Ultraviolet Light Emitting Diode) and a diffusion plate or body. The water supply pipe 25 may be fully inserted into the UV filter 49 such that the water outlet 27 may be provided within the hole 331, or the water supply pipe 25 may be partially inserted into the UV filter 49 such that water discharged from the water outlet 27 may flow directly through the hole of the UV filter 49 to be directly sterilized.

An upper portion 491 of the UV filter 49 (or more generally, an upper portion 291 of the coupler 29) may be inserted into the hole 331. The sealing ring 37 may be inserted between the second boss 364 of the plate support 36 and the first boss 33 and the outflow member 29. A lower end of the coupler 29 may be placed on the partition plate 38. A reinforcing ring 39 may be provided on a bottom surface of the plate support 36. The reinforcing ring 39 may be supported by a reinforcing rib 621 of the light base 62 described later.

Figure 6:
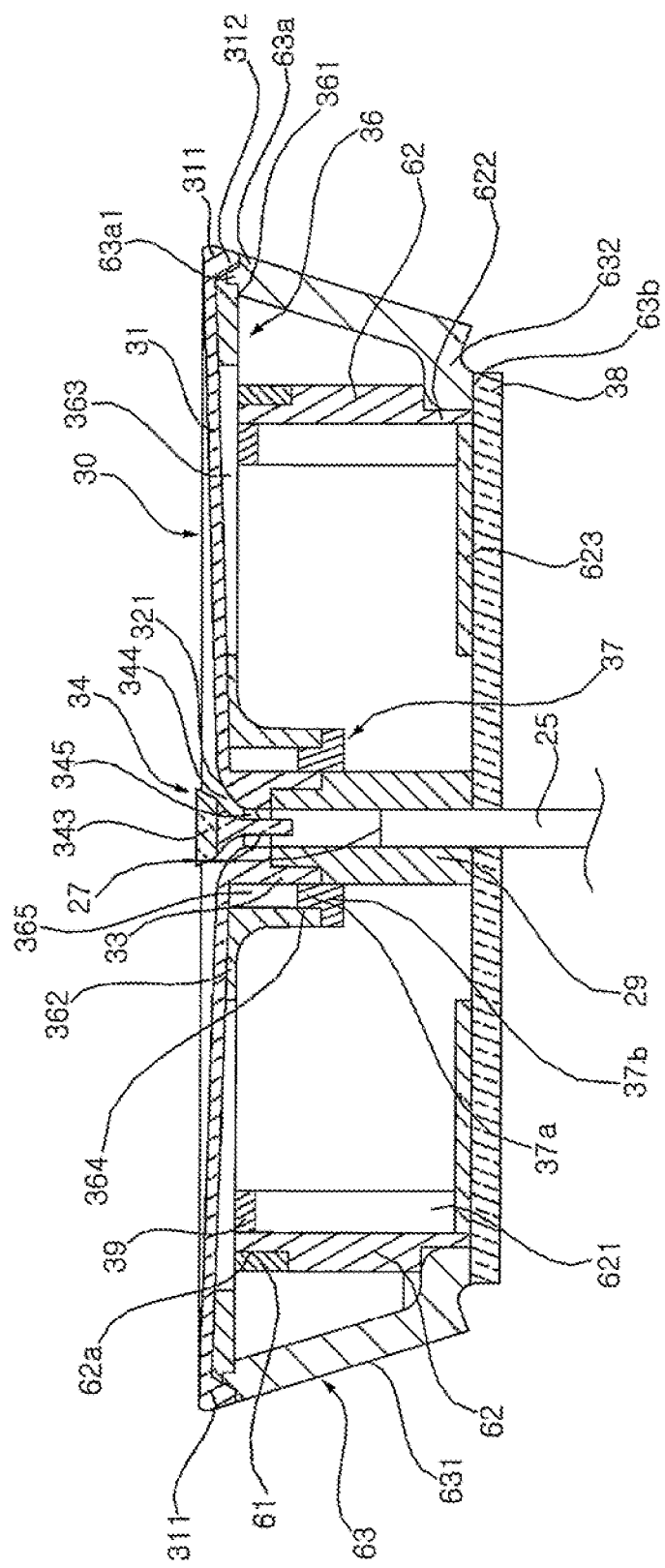
FIG. 6 is a cross-sectional view of the illumination assembly shown in FIG. 5.

Referring to FIGS. 6 and 7, the water supply plate 30 may be separated from the sealing ring 37 and support plate 38. The sealing ring 37 may be inserted into the second boss 364 so as to be press-fitted between the second boss 364 and the coupler 29 (and/or the optional UV filter 49). The first boss 33 may be at least partially inserted into a space between the sealing ring 37 and the upper portion 291 (or the upper portion 491) and may not contact the second boss 364. A lower portion 292 of the coupler 29 below the upper portion 291 may accommodate part of the water supply pipe 25.

The water supply plate 30 may be stably supported. However, if the water supply plate 30 is lifted up and held by the edge 311 of the water supply plate 30, an elasticity of the sealing ring 37 may be overcome to lift off the water supply plate 30. Alternatively, the water supply plate 30 and the plate support 36 may be separated from the coupler 29 in a state of being coupled with the sealing ring 37.

Thus, the user may separate the water supply plate 30 to conveniently clean or repair the water supply plate 30. Further, the user may swap the water supply plate 30 with another water supply plate having a different shape, height, angle of inclination, or material. Accordingly, the user may select any one of various water supply plates 30 described later to provide a pet water dispenser suited to the taste of the user or pet.

Referring to FIG. 8, the water supply plate 30 may be formed in the shape of a disk whose upper side 310 is circular. However, the present invention is not limited thereto, and the water supply plate 30 may be formed as a plate having an upper side 310 having a regular polygonal shape. Alternatively, the water supply plate 30 may be formed in various other shapes. Although the water supply hole 32 is shown as being formed at the center of the water supply plate 30, it may be formed at various other positions.

The edge 311 of the water supply plate 30 may be formed to be slightly curved so that water may easily flow off the edge 311. Although the upper surface 310 may be flat and smooth, a floor or ground surface on which the pet water dispenser is placed may not be perfectly horizontal or smooth. The upper surface 310 of the plate body 31 may be provided with a rib 315 to guide a flow direction of the water and to supply water over the entire upper surface 31 of the water supply plate 30. The rib 315 may extend from the water supply hole 32 to the edge 311, and there may be a plurality of ribs 315 to divide the upper surface 310 at a predetermined rib angle around the water supply hole 32.

Figure 8A:
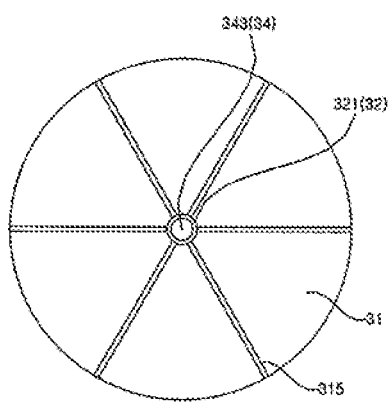
FIGS. 8A-8B are plan views of a water supply plate having ribs formed thereon.
Figure 8B:
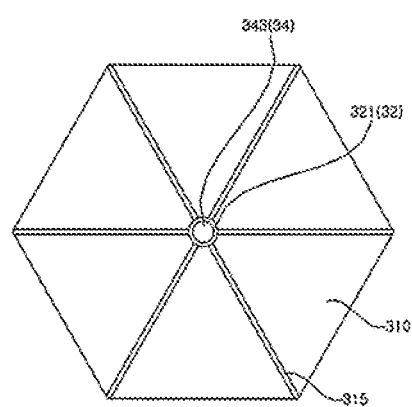

For example, as exemplified in FIG. 8A, the upper surface 310 of the water supply plate 30 may be formed in a circular shape, and six ribs 315 may be formed at angles of 60 degrees from each other.

When the water supply plate 30 is formed into a polygonal plate, the ribs 315 may extend between the water supply hole 32 and apices or corners of the polygon shape. The water divided by the ribs 315 may be dropped in a plane, and the pet may easily drink water. As exemplified in FIG. 8B, when the upper surface 310 of the water supply plate 30 is formed into a regular hexagon, six ribs 315 may be formed between the water supply hole 32 and six vertices. The six ribs 315 may be formed at an angle of 60 degrees with respect to the water supply hole 32. In this case, the water divided by the ribs 315 may be vertically dropped from each of the six sides of the hexagon forming the edge 311.

The water supply plate 30 may be made of metal (e.g. stainless steel) and may be formed so that a thickness of the plate body 31 is thin. Alternatively, the water supply plate 30 may be made of ceramics or plastic, or may be made of ceramic coated metal or plastic coated metal. The support 63 may be made of a transparent or semi-transparent material. When the water supply plate 30 is made of stainless steel, corrosion may be reduced, and a luxurious appearance may be perceived.

Figure 9A:
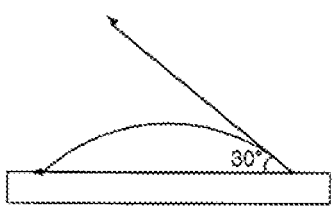
FIGS. 9A-9C are conceptual diagrams showing various contact angles of a water droplet on various materials or configurations of the water supply plate.
Figure 9B:
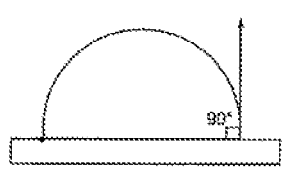

Referring to FIG. 9, the upper surface 310 of the water supply plate 30 may be formed as a super-hydrophobic surface with protruding nano-unit fine protrusions. As shown in FIG. 9A, when a water droplet is placed on a hydrophilic material, an angle between a side surface of the water droplet and the material may be 30 degrees or less because the material may have absorbed the water droplet to become wet or because there may be a lot of surface tension between the water droplet and the material. As shown in view (b), when a water droplet is placed on a hydrophobic material, an angle between a side surface of the water droplet and the material may be 90 degrees because the material generally repels water.

Figure 9C:
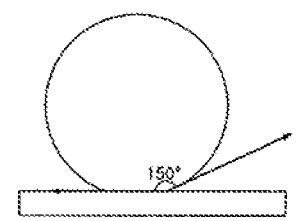

As shown in FIG. 9C, when a water droplet is placed on a super-hydrophobic material, an angle between a side surface of the water droplet and the material may be 150 degrees or more because the material may absorb much less water than most materials and/or because a surface tension is reduced between the water droplet and the material. A contact surface between the water droplet and the material is relatively small. An example of a super-hydrophobic material is a lotus leaf, where water droplets appear to be almost spherical.

There is a top-down method and a bottom-up method to implement a super-hydrophobic surface having nano-scale microprojections (i.e., an inherent roughness). The top-down method is a technique to fabricate a nanostructure by mechanically processing the structure by using a device such as a laser. The bottom-up method is a technique that creates large and complex structures by integrating small structures such as nanoparticles or organic and inorganic components. In order to create a super-hydrophobic surface, a material having a low surface energy (e.g., a fluorine-based compound) may be coated onto an already rough surface (in the bottom-up method), or may be directly processed (in the top-down method). There are a plurality of techniques known to make the super-hydrophobic material, so a detailed description thereof will be omitted. The upper surface 310 of the water supply plate 30 may be formed as a super-hydrophobic surface having nano-scale micro protrusions protruding from the plate body 31.

Water supplied to the water supply plate 30 may be recovered back through the water supply hole 32 after the use of the pet water dispenser is completed, eliminating contamination by removing residual water. Larger foreign objects may be caught between the plug 34 and the upper portion 321 of the water supply hole 32 and may be directly removed by the user. The above-described UV filter 49 may be installed below the water supply hole 32 to sterilize the recovered residual water.

The water supply plate 30 may be made of a ceramic or metal material and the upper surface 31 may be coated with an oxide coating such as glass or alumina. When it is made of ceramic or coated with ceramic, the coating may create an antibacterial effect to reduce odor.

An illumination assembly 60 to be described later may be provided between the water supply plate 30 and the water tank 10. The water supply plate 30 may be made of a transparent or semi-transparent light guide plate so that light from the illumination assembly 60 may be illuminated through the water supply plate 30 to enhance aestheticism.

As previously described with reference to FIGS. 5-7, the water supply plate 30 may be coupled to the plate support 36 using the sealing ring 37. Alternatively, referring to FIGS. 10-13, the water supply plate 30 may be releasably seated on the plate support 36.

Referring to FIG. 10, the first boss 33 may be inserted so that an outer circumferential surface thereof is in contact with an inner circumferential surface of the second boss 364. There may not be a sealing ring 37 between the first and second bosses 33 and 364. The water supply plate 30 may be supported on the plate support 36, which may restrain a movement in the horizontal direction. The water supply plate 30 may be separated from the plate support 36 in the vertical direction.

Figure 11A:
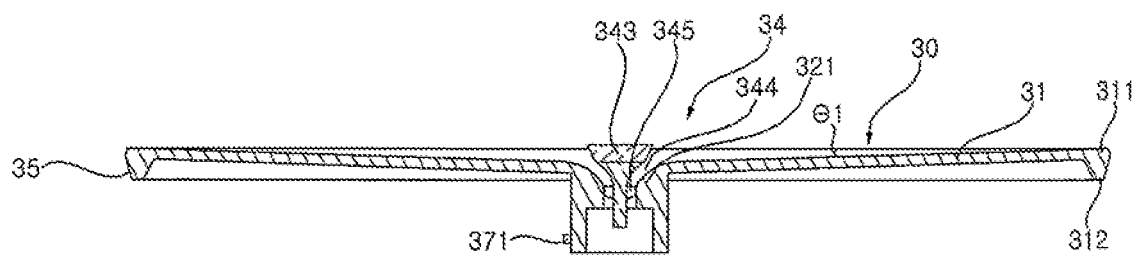
Figure 11B:
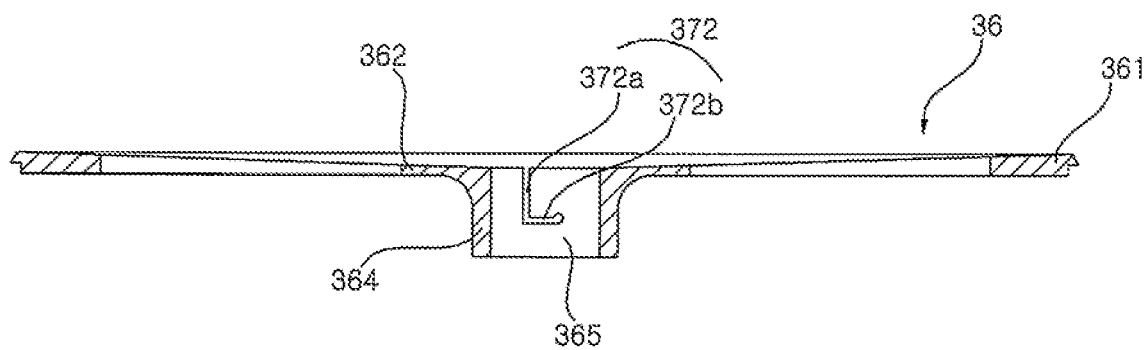

Referring to FIG. 11, the first boss 33 of the water supply plate 30 may be formed with a guide protrusion 371 protruding from the outer circumferential surface. The second boss 364 of the plate support 36 may have a guide groove 372 formed on an inner circumferential surface thereof. The guide protrusion 371 and the guide groove 372 may be engaged with each other. The guide protrusion 371 and the guide groove 372 may be configured to prevent the water supply plate 30 from moving in the horizontal and vertical directions or rotating within from the plate support 36.

The guide groove 372 may have a first guide groove 372a formed in a first direction and a second guide groove 372b formed in a direction different from the first direction to create a locking-jaw structure. As an example, the first guide groove 372a may extend in the vertical direction at an upper end of the inner surface of the second boss 364. The second guide groove 372b may extend horizontally from a lower end of the first guide groove 372a.

The guide protrusion 371 may be spaced apart from the lower surface of the water supply plate 30 by a predetermined distance. The second guide groove 372b may be spaced apart from an upper surface of the plate support 36 by the predetermined distance. Thus, the water supply plate 30 may be firmly engaged with the plate support 36 when the guide protrusion 371 is placed into the second guide groove 372b.

The second guide groove 372b may be divided into an end portion and an extended portion extending from the first guide groove 372a to the end portion. The extended portion of the second guide groove 372b may have a width that is smaller than an outer diameter of the guide protrusion 371.

The end portion of the second guide groove 372b may have the same width as the outer diameter of the guide protrusion 371. The guide protrusion 371 may slide along the first guide groove 372a, and may be press-fitted and slid along the second guide groove 372b until reaching the end of the second guide groove 372b. The guide protrusion 371 may remain in the end portion of the second guide groove 372b since the extended portion has a width smaller than a diameter of the guide protrusion 371.

The first boss 33 may be inserted into the second boss 364 so that the guide protrusion 371 is engaged with the first guide groove 372a. The water supply plate 30 may then be rotated so that the guide protrusion 371 slides along the second guide groove 372b so that the water supply plate 30 may be engaged with the plate support 36. When separating the water supply plate 30 from the plate support 36, the user may rotate the water supply plate 30 such that the guide protrusion 371 moves through the second guide groove 372b. The water supply plate 30 may be lifted upward to slide the guide protrusion 371 along the first guide groove 372a to separate the water supply plate 30 and the plate support 36.

The water supply plate 30 may be fixedly supported in the plate support 36. Further, it may be easy to separate the water supply plate 30 to wash it, repair it, or swap it with another water supply plate having a different shape, height, and/or angle of inclination.

Figure 12A:
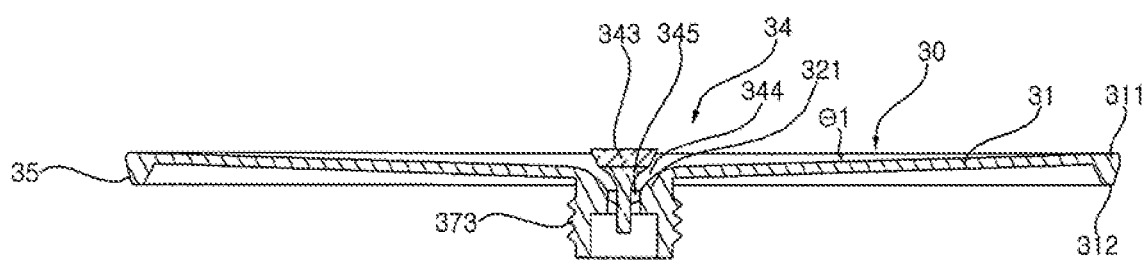
Figure 12B:
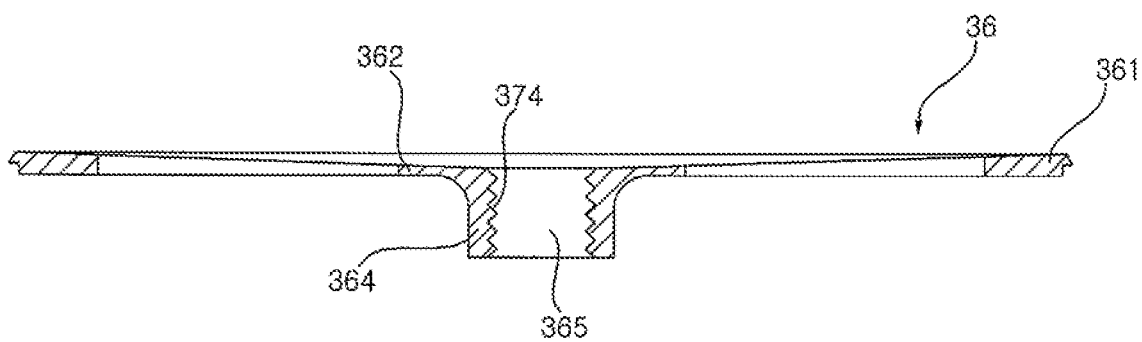

As another alternative, referring to FIG. 12, the water supply plate 30 may be screwed into the plate support 36. The first boss 33 may have a male thread 373 formed on the outer circumferential surface thereof. The second boss 364 may have a female thread 374 configured to engage with the male thread 373 on the inner circumferential surface. The water supply plate 30 and the plate support 36 may be screwed together. Accordingly, the water supply plate 30 may be fixedly supported in the plate support 36, and separation may be easy.

Figure 13A:
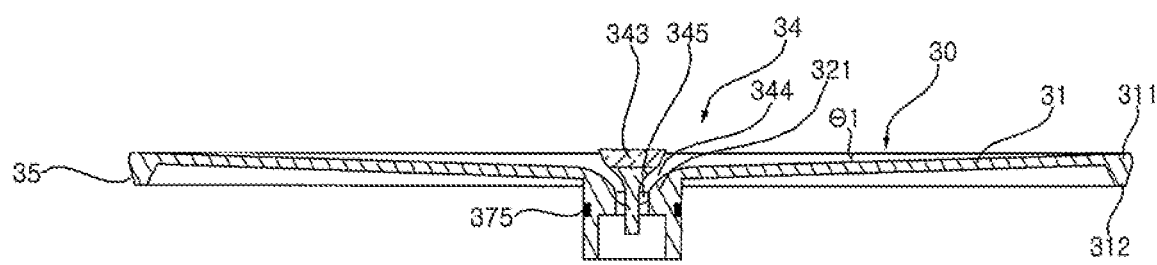
Figure 13B:
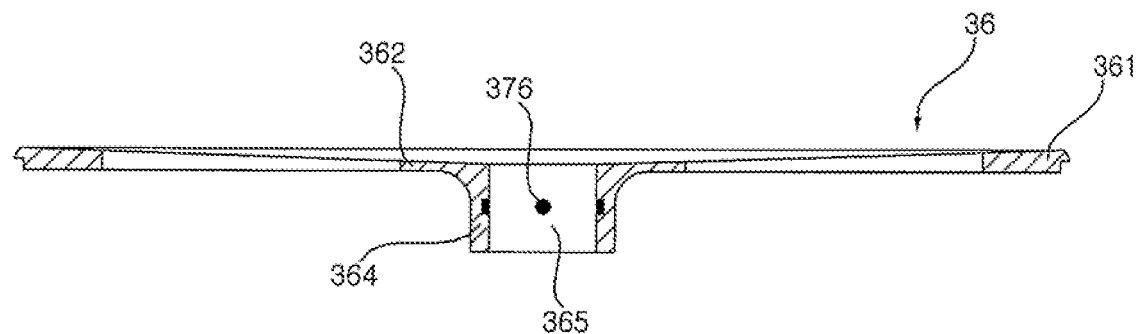

In yet another alternative, referring to FIG. 13, the water supply plate 30 may be coupled to the plate support 36 using magnets. The first boss 33 and the second boss 364 may include first and second magnets 375 and 376 of different polarities, respectively. A plurality of second magnets 376 may be installed on the inner circumferential surface of the second boss 364 at predetermined intervals in the circumferential direction. A plurality of first magnets 375 may be installed on the outer circumferential surface of the first boss 33 to face the plurality of second magnets 376 when the first boss 33 is inserted into the second boss 364. The number of first magnets 375 may equal the number of second magnets. Alternatively, there may only be one first magnet 375 and/or one second magnet 376. Furthermore, the first and second magnets 375 and 476 may be formed as rings.

Referring back to FIGS. 5 and 6, the illumination assembly 60 may include a light emitter or light device 61, a light base or light support 62 on which the light emitter 61 is installed, and a light diffuser or support 63 provided to surround an outer peripheral side of the light base 62. The light base 62 may also be referred to as a light mount, and the support 63 may also be referred to as a light guide plate or light guide. The light base 62 may be formed in a cylindrical shape, while the support 63 may have a truncated cone shape.

The support 63 may form an outer edge of the illumination assembly 60. The support 63 may be formed in a trumpet or truncated cone shape which has an increasing diameter from a bottom or lower end 63b to a top or upper end 63a. The support 63 may extend between the water supply plate 30 and the water guide 50 described later.

The upper end 63a of the support 63 may be in contact with the edge protrusion 312 of the water supply plate 30 and the outer ring 361 of the plate support 36. The lower end 63b of the support 63 may be provided on the partition plate 38. Alternatively, the lower end 63b may be provided on an upper side of a guide or guide surface 54 of the water guide 50 described later. As another alternative, the lower end 63b may be provided on a groove 541 formed on an upper surface of the water guide 50 near the guide 54, and the partition plate 38 may also be provided on the groove 541 adjacent to the lower end 63b.

The support 63 may have an inwardly projecting portion or inward projection 632 protruding inward from the lower end 63b. An inner end of the inward protrusion 632 may extend downward to be on the partition plate 38, and an outer end of the inward protrusion 632 may be engaged with an upper side of the guide 54 or the groove 541.

An outer side surface 631 of the support 63 may form an inclined surface that is inclined gradually inward from the edge 311 of the water supply plate 30 toward the inward projection 632. Based on the flow of water pumped by the pump 20, the water dropped from the edge 311 of the water supply plate 30 may fall vertically without flowing along the support 63. The cascading water creates a waterfall to simulate running water, which is pleasing for animals.

The light device 61 may include at least one light emitting diode (LED). A plurality of light devices 61 may be attached to the light base 62 to form an array of predetermined shapes. The light device 61 may be inserted and attached to an inwardly recessed or step portion 62a formed on an outer surface of the light base 62 at an upper side.

The light device 61 may be fabricated as an organic light emitting diode (OLED). In addition, the light device 61 may be made of a strip-shaped OLED and attached to the light base 62 to form a ring shape. A plurality of arc-shaped OLEDs may be provided on the light base 62. The plurality of arc-shaped OLEDs may be formed as a single ring-shaped light device 61 by connecting ends of the OLEDs. For example, a ring-shaped light device 61 may be formed by providing three arc-shaped OLEDs having a radius of curvature of 120 degrees.

The light base 62 may be provided inside the support 63. The light base 62 may be provided between the water supply plate 30 and the partition plate 38 (or alternatively, the water guide 50). A recess or step portion 622 may be formed to recess inward on the outer surface of the light base 62 at a lower side. The step portion 622 may receive the inward projection 632 of the support 63. The support 63 and the light base 62 may then be placed together on the partition plate 38.

At least one reinforcing rib 621 may be formed on an inner surface of the light base 62. The reinforcing rib 621 may be provided below the reinforcing ring 39 to support the reinforcing ring 39.

A printed circuit board (PCB) 623 on which a processor that controls light emission from the light device 61 may be provided on the lower side of the light base 62. The PCB on may be placed on the partition plate 38 and extend horizontally from the light base 62.

The light base 62 may be a housing where an inner side may be a sealed space accommodating electrical wires. A wire connecting the PCB 623 and the light device 61 may be accommodated in a space between the reinforcement ribs 621. The reinforcing ring 39 may be provided as a housing holder to support the light base 62 while fixing the reinforcing rib 621 to the light base 62.

The light base 62, the support 63, and the partition plate 38 may be joined together (i.e., bonded, fused, or welded) to be integral with each other, or may be assembled to be detachable from each other.

Figure 14:
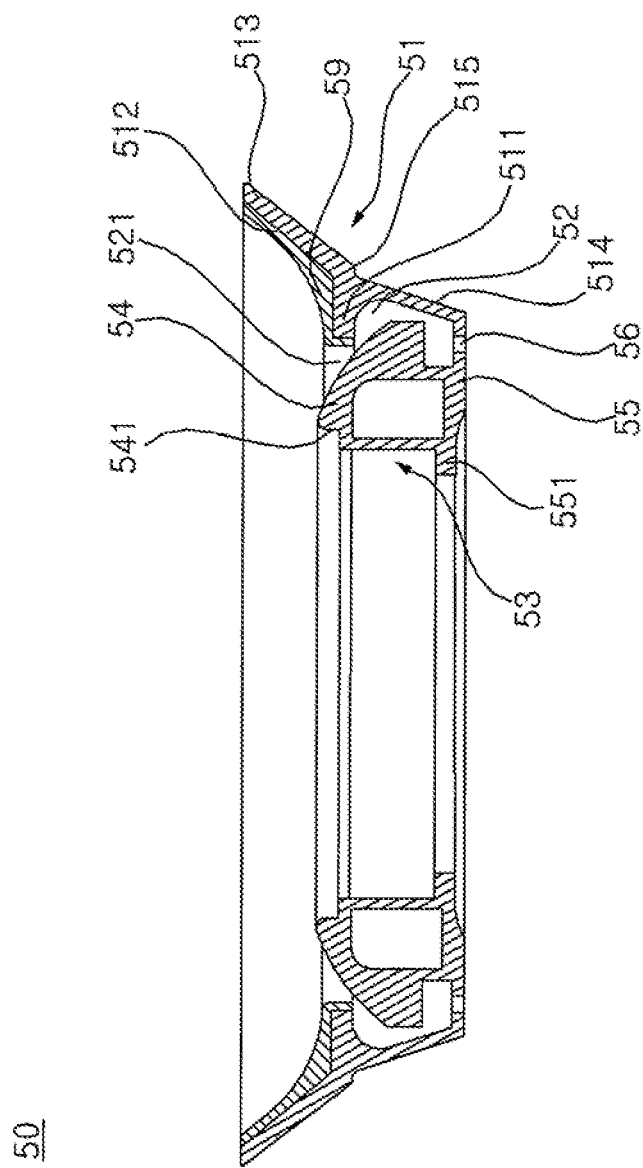
FIG. 14 is a sectional view of a water guide.

Referring to FIGS. 2 and 14, the water guide 50 may be positioned below the water supply plate 30. Alternatively or in addition thereto, the water guide 50 may at least partially cover the opened top of the water tank 10 and may receive the water dropped from the edge 311 of the water supply plate 30 and guide it to the water tank 10.

The water guide 50 may include an outer guide wall 51 forming an outer rim and an inner guide wall 53 forming an inner rim. A drain passage or drainage passage 521 may be formed between the inner and outer guide walls 53 and 51. A bottom wall 55 may extend between the inner and outer guide walls 53 and 51, and may include a discharge hole 56 communicating with the drainage passage 521 to guide water to the water tank 10. The hole 56 may be formed in one or more ring-shaped holes or circular holes formed along the circumferential direction of the bottom wall 55.

The inner guide wall 53 may be formed with a guide 54 protruding toward the outer guide wall 51 and inclined downward. Water dropped from the water supply plate 30 may be guided downward along the guide 54. The guide 54 may be formed such that the surface thereof is rounded or curved.

An upper side of the guide 54 may be in contact with the partition plate 38. As an alternative, the upper side of the guide 54 may contact the lower end 63b of the support 63 or alternatively the inward protrusion 632. A groove 541 may be formed in the upper side of the guide 54 so that an edge of the partition plate 38 may be positioned in the groove 541, and the support 63 may be provided above the upper side of the guide 54 on the partition plate 38.

An upper portion of the guide 54 may be formed to be smaller than the water supply plate 30 and a lower portion of the guide 54 may be to be formed larger than the water supply plate 30 when viewed from above. The water dropped from the water supply plate 30 may be guided by the guide 54 to the water tank 10.

The support 63, the water guide 50, and the partition plate 38 may be assembled to be detachable from each other by a known method, or may be permanently connected (e.g., adhered, fused, or welded) to each other. When the water guide 50 is assembled to be detachable from the support 63, the water guide 50 may be replaced with a water guide having a different shape or height.

The outer guide wall 51 may have a protrusion 511 on an inner side thereof protruding toward the guide 54. An inner surface 512 of the outer guide wall 51 that extends upward from the protrusion 511 may be formed as an inclined surface extending upward. The drainage passage 521 may be narrower at a position between the protrusion 511 and the guide 54.

A coating or covering layer 59 made of a material different from the water guide 50 may be coated on the inner surface 512 and the upper surface of the protrusion 511. The outer guide wall 51 may be formed to be larger than the inner guide wall 53 since the outer guide wall 51 may surround the inner guide wall 53. Referring to FIGS. 1-2, the outer guide wall 51 may be formed to be wider than the upper wall 11a so as to form a predetermined guide angle 62 with respect to the upper wall 11a. The predetermined guide angle 92 may be, for example, 120 degrees when measured from an outer surface of the upper wall 11a to an outer surface of the outer guide wall 51.

The outer guide wall 51 of the water guide 50 may be positioned lower than the water supply plate 30 so that the pet may easily drink water falling off the water supply plate 30. The outer guide wall 51 may be located lower than the upper end 63a of the support 63 so that the light emitted by the light device 61 may be easily seen.

An outer surface of the outer wall 51 may be formed with upper and lower inclined surfaces 513 and 514. A step portion 515 may be formed between the upper and lower inclined surfaces 513 and 514. The lower inclined surface 514 of the water receiver may be supported within the inner tank wall 113 of the water tray 10, and may have an inclination corresponding to the inclination of the inner tank wall 113. The upper inclined surface 513 may be seated on the first protruding plate 111 via the step portion 515. The upper inclined surface 513 contact the bumper 115 attached on the upper wall 11a.

The water guide 50 may be firmly provided above the water tank 10. The support 63 and the partition plate 38 may be held in contact with the guide 50. The light base 62 may be held in contact with the partition plate 38. The water supply plate 30 may be held in contact with the support 63 and the light base 62. As a result, the water supply plate 30 may be securely positioned above the water tank.

Referring back to FIG. 14, the bottom wall 55 of the water guide 50 may have an extension or protruding jaw 551 protruding inward from the inner guide wall 53. The extension 551 may be positioned above an edge of the upper filter cover 46. The bottom wall 55 may further be curved such that the discharge hole 56 and the lower end of the outer guide wall 51 may be lower than the extension 551.

Referring to FIG. 2, a sealed space or chamber S may be formed between the upper filter cover 46, the inner guide wall 53 of the water guide 50, and the partition plate 38. An auxiliary battery B and the controller C may be installed in the space S, and may be powered via external power applied to a docking station provided below the container support 71 and wireless power transfer devices (e.g., transceivers) provided in the container support 11b and the inner assembly 100. Details of a wireless power transfer (WPT) process are provided in related U.S. application Ser. No. 16/571,075 filed on Sep. 14, 2019, the entire contents of which are incorporated by reference herein.

The extension 551 and the upper filter cover 46 of the water guide 50 may be assembled to be detachable from each other by a coupling device such as an arm, a hook, or a screw. Alternatively, the filter 40, the pump 20, the water supply pipe 25, the water supply plate 30, the lighting device 60, and the water guide 50 may be combined or assembled together to form a single inner assembly.

The inner assembly may be detachably provided in the water tank 10 at the water guide 50 and at the lower filter cover 43 because the step portion 515 may be hooked onto an end of the first protruding plate 111 and the lower inclined surface 514 may be supported by the inner tank wall 113, and also because the lower filter cover 43 may be inserted onto the protrusion 121 and the flange 431 and be seated in the groove 122. The inner assembly may be stably installed in the water tank 10, but may be easily separated or removed from the water tank 10 by lifting the outer guide wall 51, allowing for easier or a convenient cleaning and maintenance.

A thermoelectric element (e.g., a Peltier device or a thermoelectric cooler), a heat dissipating fan, and a heat sink may be provided below the bottom plate 12 of the water tank 10 to maintain a temperature of the water stored in the water tank 10 at a predetermined temperature. Various sensors, such as a water level sensor, a proximity sensor 87, a gyro sensor 88, and a water temperature sensor may be provided under the bottom plate 12 within the container support 11b.

An angle adjusting assembly capable of adjusting an inclination angle of the water supply plate 30 and/or the water tank 10 may be provided. When an inclination angle of the water tank 10 detected by the gyro sensor 88 is determined to be equal to or greater than a predetermined value, the inclination angle of the water supply plate 30 may be adjusted to be horizontally arranged or to return to an initial orientation.

Figure 15:
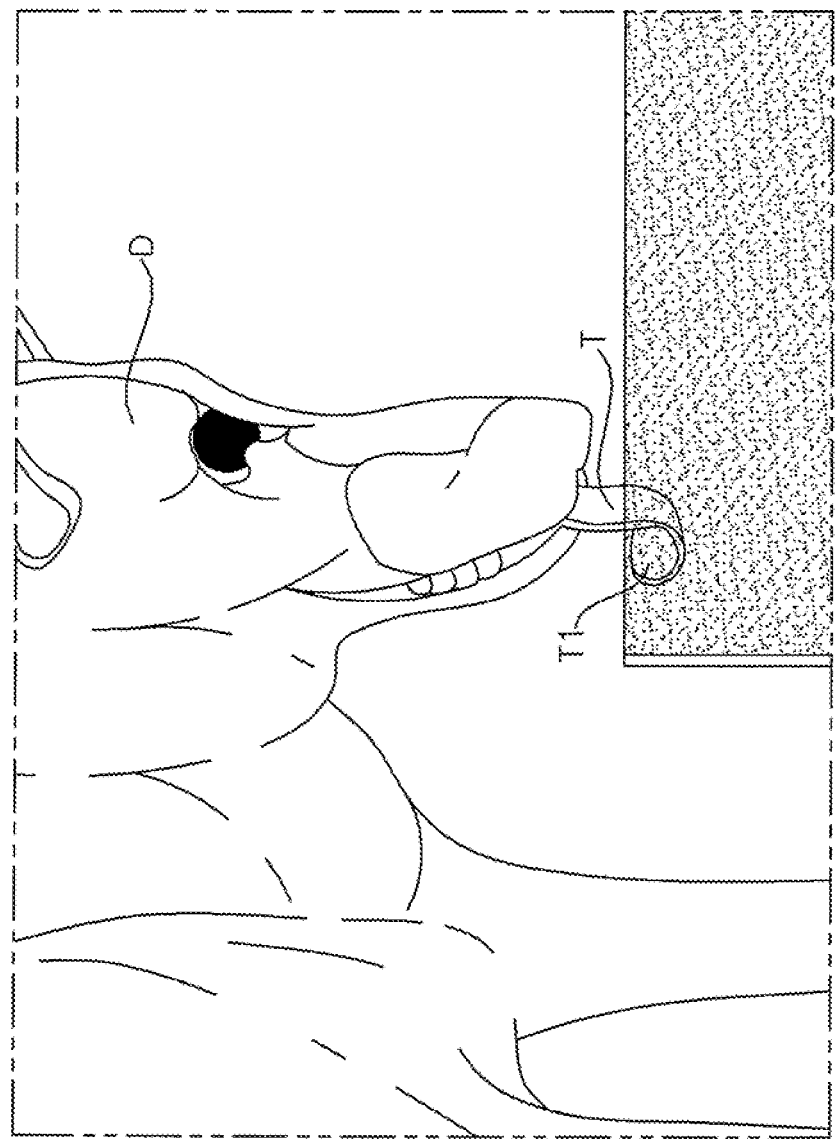
FIG. 15 is a conceptual diagram showing the shape of a pet's tongue during drinking.

Referring to FIG. 15, when an animal, e.g., a dog D is drinking water, its tongue T may be curled backward to form a space T1 on a back side of the tongue T in which water may be stored, poured from, and consumed from. A water dispenser requiring a pet to use a front surface of its tongue may not be suitable for most dogs. Also, pets are known to prefer water that flows. However, when water flows downward along a flat surface as opposed to in free fall, a depth of the flowing water may not be sufficient to accommodate a dog who drinks like the dog D in FIG. 15.

The water supply plate 30 of embodiments disclosed herein is provided at a position higher than the water tank 10. The water supply plate 30 may be formed to be inclined upward from the water supply hole 32 toward an edge. The water supplied to the water supply plate 30 may fall from the edge 311 of the water supply plate 30 and be in free fall until hitting the water guide 50. The dog D may easily drink from the falling water. Further, since the falling water may fall in a planar shape or as a continuous wall of water based on the shape of the water supply plate 30, the pet water dispenser may accommodate a large number of pets without any inconvenience or crowding.

The water dropped from the water supply plate 30 into the water guide 50 may remain on the protrusion 511 formed on the guide 54 and may slowly move downward through the narrow drain passage 521. Due to the slow movement of water caused by the narrow drain passage and the flow of water through the opening, a pool of water may form between the outer surface 631 of the support 63 and the coating layer 59 of the upper inclined wall 513. The water that has fallen into the water guide 50 may form a depth deep enough for the pet to drink water from the water guide 50 in addition to the water cascading off from the edge 311 of the water supply plate 30.

Furthermore, the narrow drainage passage 521 may act as an additional filter. The pet may drink water after eating, in which case food in the mouth or on the snout of the pet may be filtered by the narrow drainage passage 521 and/or the bottom wall 55, while the water may be drained into the water tank 10. It is thus possible to prevent large food particles from floating in the water tank 10.

The OLEDS or LEDS in the light device 61 of the illumination assembly 60 and/or the UV light in the UV filter 49 may also treat seasonal depression, which may be experienced by both pets and humans during rainy or colder months. When the pet water dispenser is operated, the light device 61 may be turned on, and water may be vertically dropped from the water supply plate 30 toward the water tank 10. The support 63 may be formed to be smaller than the water supply plate 30 when seen from above, so that light emitted from the light device 61 may be illuminated through the support 63 and the falling water.

The light device 61 may include a light emitting diode (LED) or an organic light emitting diode (OLED) as described above to mitigate seasonal depression of the pet. When the light device 61 is formed of an organic light emitting diode (OLED), the light device 61 may be formed to have a small thickness and may be formed along the light base 62 in a ring or belt shape.

Figure 16:
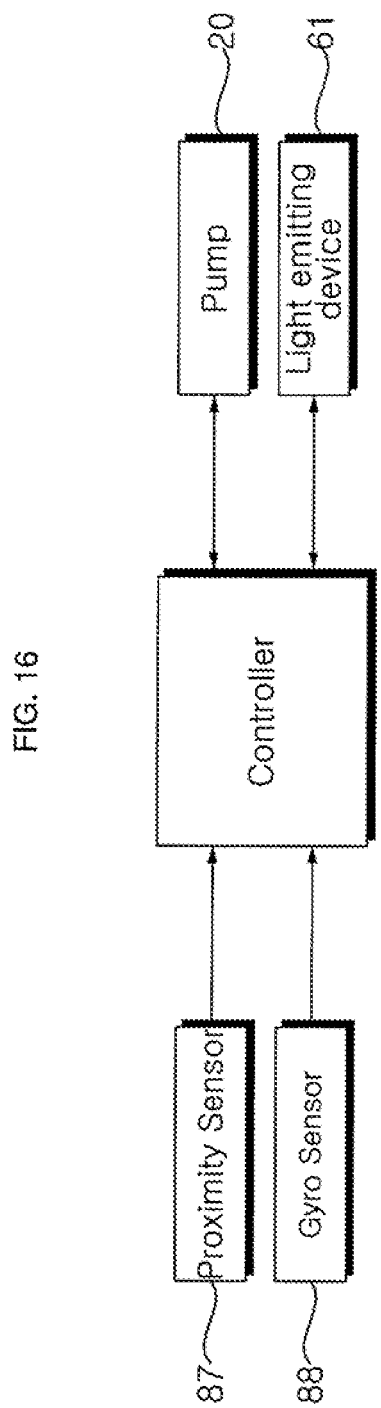
FIG. 16 is a block diagram showing a controller.

Referring to FIG. 16, the controller C may receive a signal from the proximity sensor 87 to determine whether a pet is present within a predetermined distance range, and may further determine, based on a repetitive sensing by the proximity sensor, whether a pet is approaching the water dispenser within the predetermined distance range. The controller C may turn on the pump 20 when it is determined that a pet is present within the predetermined distance range or alternatively when the pet is approaching the pet water dispenser within the predetermined distance range. The controller C may stop the operation of the pump 20 when it is determined that the pet is not within the predetermined distance range. The controller C may control the pump 20 to be operated only when the pet continues to approach the pet water dispenser by certain increments or more within the predetermined distance.

The controller C may control the light device 61 to be turned on in conjunction with the operation of the pump 20. Alternatively, even when the pump 20 is not operating, the light device may be turned on so as to serve as a lighting device or lamp.

In addition, when it is determined that a plurality of pets are approaching based on signals received from a plurality of proximity sensors 87, the controller C may increase the pumping capacity or rate of the pump 20 so as to correspond to the number of approaching pets. Thus, a supply of water may be customized based on a number of pets approaching the pet water dispenser. When the inclination angle or a tilt of the water tank 10 is determined to be equal to or greater than a predetermined value or angle based on a signal received from the gyro sensor 88, an angle adjusting unit or assembly provided below the water tank 10 or water supply plate 30 may be operated to rotate the water supply plate 30 and/or the water tank 10 and return the water supply plate 30 and/or the water tank 10 to an initial orientation to prevent spillage of the water.

This application is related to U.S. application Ser. No. 16/571,245 filed on Sep. 16, 2019, U.S. application Ser. No. 16/571,093 filed on Sep. 14, 2019, U.S. application Ser. No. 16/571,090 filed on Sep. 14, 2019, U.S. application Ser. No. 16/571,089 filed on Sep. 14, 2019, U.S. application Ser. No. 16/571,076 filed on Sep. 14, 2019, U.S. application Ser. No. 16/571,074 filed on Sep. 14, 2019, U.S. application Ser. No. 16/571,075 filed on Sep. 14, 2019, U.S. application Ser. No. 16/571,073 filed on Sep. 14, 2019, U.S. application Ser. No. 16/570,310 filed on Sep. 13, 2019, U.S. application Ser. No. 16/569,827 filed on Sep. 13, 2019, U.S. application Ser. No. 16/659,841, filed on Sep. 13, 2019, and U.S. application Ser. No. 16/569,908 filed on Sep. 13, 2019, the entire contents of which are incorporated by reference herein.

Further, the following Korean Applications are also incorporated herein by reference: 10-2018-0122992 filed on Oct. 16, 2018; 10-2018-0123552 and 10-2018-0123553 filed on Oct. 17, 2018; 10-2018-0131037 filed on Oct. 30, 2018; 10-2018-0131405 filed on Oct. 31, 2018; 10-2019-0059513 and 10-2019-0059514 filed on May 21, 2019; 10-2018-0133062, 10-2018-0132643 and 10-2018-0132645 filed on Nov. 1, 2018; 10-2019-0059787 filed on May 22, 2019; 10-2019-0060918, 10-2019-0060919, and 10-2019-

0060920 filed on May 24, 2019; and 10-2019-0080603 and 10-2019-0080604 filed on Jul. 4, 2019.

Embodiments disclosed herein may be implemented as a liquid dispenser that supplies drinking water to an animal such as a pet. However, embodiments disclosed herein are not limited to pets. For example, the liquid dispenser may be used in a zoo to supply drinking water to animals kept in a zoo, research areas, wildlife preservation areas, etc.

Embodiments disclosed herein may provide a pet water dispenser in which a pet is able to consume water in a comfortable posture through any side of or position around the water dispenser such that two or more pets may easily consume water at the same time. The pet water dispenser may be capable of producing flowing water and falling water. In the pet water dispenser, water may flow smoothly toward an edge of a water supply plate and supply a large amount of water. Water may not rise upward from a water supply hole, and may not jump around or scatter on the water supply plate. A depth of the water may sufficient for the pet to drink using its tongue.

The water supply plate may be configured to prevent water from flowing downward along on a side surface of a structure below the water supply plate and may instead encourage water to fall directly off the edge of the water supply plate toward a water tank that stores water to recirculate the water. Water may not splash or scatter against a pet during drinking. The pet water dispenser may provide fresh water containing a large amount of oxygen.

The problems solved by embodiments disclosed herein are not limited to the above-mentioned problems, and other problems not mentioned may be clearly understood to be solved by those skilled in the art from the following description.

A pet water dispenser according to embodiments disclosed herein may include a water supply plate, water feed plate, or upper plate provided higher than an upper surface of water stored in a water tank. The water supply plate may be provided higher than the water tank. The water stored in the water tank may flow along a water supply pipe or pipe by a pump and supplied to the water supply plate. The water supply plate may have a water supply hole communicating with the water supply pipe, and water may be supplied from the water supply pipe.

The water supply plate may have a plate body through which water flows from the water supply hole toward an edge, and may be provided so as to be spaced upward from the water tank. The plate body may be formed so as to be inclined upward toward the edge of the water supply plate from which water drops from the water supply hole through which water is supplied. The plate body may be inclined upward from the water supply hole toward the edge of the water supply plate, and may be inclined upward while maintaining a constant inclination.

The water supply plate may have an upper surface through which water flows from the water supply hole toward the edge, and an outer circumferential surface forming a side surface of the water supply plate. The upper surface of the water supply plate may be inclined upward toward the edge from the water supply hole. The outer circumferential surface of the water supply plate may be formed such that the water flowing along the upper surface falls down from the edge toward the water tank without flowing on the outer surface of the structure provided on the lower side of the water supply plate, and may be inclined to approach the center.

The pump may be adapted to adjust an amount of water supplied to the number of pets that consume water and to pump the water stored in the water tank to ensure water flowing through the water plate drops from the edge.

The water supply plate may be conveniently cleaned by separating the water supply plate. The water supply plate may be easily reassembled and may be replaced with another water supply plate, and the water supply plate may be detached or removed and stably supported. A plate support may support the water supply plate. The water supply plate may be detachably seated on the plate support.

The water supply plate may include a first boss portion or first boss protruding downward from the plate body. The water hole may be formed in the first boss portion. The plate support may include a second boss portion or second boss protruding downward at a position corresponding to the first boss portion. The first boss portion may be inserted into the second boss portion.

The pet water dispenser may include a water outlet portion or water outlet having a hole communicating with the water supply hole. The water supply pipe may be inserted into the hole formed in the water outlet.

The water supply plate may have an edge protrusion protruding downward from an edge of the water supply plate. The edge protrusion may be inclined so that the outer surface thereof approaches the center of the water supply plate toward the lower side. The plate support may have an outer circumferential surface contacting the inner circumferential surface of the edge protrusion.

The water supply plate may include a plurality of ribs protruding from an upper surface of the plate body. The plurality of ribs may divide the upper surface of the plate body at a predetermined angle around the water supply hole. The plurality of ribs may extend radially from a peripheral portion of the water supply hole toward an edge of the water supply plate.

The water supply plate may have an upper surface formed with a super-hydrophobic surface including fine protrusions protruding from an upper surface of the plate body. The water supply plate may be ceramic coated.

The pet water dispenser may include a lighting device or assembly provided between the water supply plate and the water tank. The water supply plate may be formed of a semi-transparent material.

The pet water dispenser according may include a nozzle cap or plug spaced upward from a portion where the water supply hole of the water supply plate is formed. The nozzle cap may form a water outlet between the water supply plate and the water supply plate. The nozzle cap may be at least partially inserted into the water supply hole. The nozzle cap may include a stem, at least a portion of which is inserted into the water supply hole, and a head formed above the stem. The head may be spaced upward from the water supply plate. The stem may be smaller in diameter than a diameter of the water supply hole to be inserted without completely closing the water supply hole.

The head may have a diameter, at least a part of which is larger than the diameter of the water supply hole, so that the direction of flow of the water supplied from the water supply hole may face the edge. A diameter of the upper end of the head cover may be larger than the diameter of the water supply hole.

The nozzle cap may be arranged such that a ring-shaped water outlet is formed between the nozzle cap and the water supply plate so that water is uniformly supplied to the water supply plate in all directions. The water supply plate may include a trumpet-shaped widening portion having a diameter gradually increasing upward in the vicinity of the water supply hole to guide the flow of water supplied from the water supply hole toward the edge of the water supply plate. The water outlet may be formed in a ring shape between the nozzle cap and the trumpet-shaped shroud.

The upper side of the water supply plate may be exposed to the outside toward the upper side to supply water flowing to the pet. The diameter of the upper portion of the nozzle cap may be larger than the diameter of the water supply hole and smaller than the diameter of the trumpet-shaped widening portion. The nozzle stopper may be configured such that even if water is supplied from the water supply hole in a state in which the water supply plate is filled with water, the water supplied to the water supply plate may be forced by the pump to flow toward the edge of the water supply plate. The upper end of the nozzle cap may be provided higher than the edge of the water supply plate so as to smoothly eject water toward the edge.

Alternatively, the water supply plate may have an upper surface maintaining a predetermined vertical angle from the water supply hole toward the edge thereof, and the upper surface of the water supply plate may extend from the water supply hole.

The pet water dispenser may be characterized in that, by supplying water to the water supply plate, the pet is able to consume water through any side of the water supply plate, and that two or more pets have sufficient space to drink from the pet water dispenser at the same time. There may be an advantage in that the water supply plate may be arranged so as to be spaced upward from the water tank so that water flowing on the upper side of the water supply plate and water falling from the water supply plate may be consumed.

The pet water dispenser may include a nozzle cap or plug which is spaced upward from a portion where a water supply hole of a water supply plate is formed. The nozzle cap may form a water outlet between the water supply plate and the nozzle cap. Even when an initial operation of the water dispenser is started or the capacity of the pump is increased, the water supplied from the water supply hole may not rise upward, and water may be prevented from splashing to a periphery of the water dispenser.

An upper side of the water supply plate may be inclined upward from the water supply hole toward the edge so that water flowing along the upper side of the water supply plate may be prevented from flowing shallowly downward along structures below the water supply plate. There is an advantage in that the flowing water may be easily pumped up by a typical dog's tongue and consumed.

Fifth, the water supplied to the water supply plate may have a momentum from the pump and the nozzle cap that sustains a flow of water toward the edge of the water supply plate. The water supply plate may include a plate body that is inclined upward from the water supply hole while maintaining a constant inclination from the water supply hole to the edge so that the water supplied to the water supply plate may maintain a propelling force flowing toward the edge. The water flowing along the water supply plate does not flow on the outer wall of the structures located below the water supply plate, but may drop directly from the edge toward the water tank. The pet water dispenser also has an advantage in that the pet may consume the falling water in a comfortable posture and in a convenient position.

The water supply plate may have a constant inclination toward the edge from the water supply hole and is inclined upward. The edge of the water supply plate may be formed to have the same height over the entire peripheral surface. Therefore, the water supplied through the water supply hole can overflow from the water supply plate at the same time. Further, the nozzle cap may form a water outlet between the water supply plate and a water supply port. The water supplied to the water supply plate may form a water film or water wall from the edge of the water supply plate and may fall toward the water tank. Also, there is also an advantage that when the pet is drinking, the water may not splash, so that the pet may drink the falling water without being surprised or afraid.

The water supplied to the water supply plate may flow along the upper side of the water supply plate, fall down toward the water tank, and form a water film or water wall from the edge as described above. It may be possible to provide fresh water containing a large amount of oxygen by widening a surface area of water in contact with outside air during circulation of water.

A liquid dispenser may include a tank, a pump installed inside the tank to pump liquid, a pipe connected to the pump through which liquid pumped by the pump flows, and a plate provided above the tank having a hole communicating with the pipe, wherein the plate includes a top inclined upward from the hole while maintaining a constant inclination from the hole toward an edge of the plate.

The plate may have an outer circumferential surface that may be inclined downward from the top of the plate to a bottom of the plate. The pump may be configured to pump liquid at varying pumping rates. A support may be provided below the plate to support the plate, and the plate may be detachably coupled to the support.

The plate may include a first boss protruding downward from a bottom of the plate and having a hole, and the support may include a second boss protruding downward at a position corresponding to the first boss. The second boss may be inserted into the hole of the first boss. The pipe may be provided within the hole of the first boss and a hole of the second boss.

The plate may have an edge protrusion protruded downward from the edge of the plate, and the edge protrusion may be inclined inward from the top of the plate to a bottom of the plate. The support may have an outer circumferential surface configured to contact and fit within an inner circumferential surface of the edge protrusion.

The plate may include a plurality of ribs projecting from the top of the plate, and the plurality of ribs may divide the top of the plate body into equivalent sections around the hole of the plate. The top of the plate may be a super-hydrophobic surface including fine protrusions protruding from the top of the plate. The plate may be a ceramic-coated stainless steel plate. An illumination assembly may be provided between the plate and the tank, and the plate may be formed of a translucent material.

A liquid dispenser may include a tank, a pump installed inside the tank, a pipe connected to the pump, and a plate provided above the tank and including a hole communicating with the pipe. The pipe may include an upper surface inclined upward from the hole toward an edge of the plate and a side surface that inclines inward from the upper surface to a lower surface.

A liquid dispenser may include a tank, a pump installed inside the tank, a pipe connected to the pump, a plate provided above the tank and having a hole communicating with the pipe to supply liquid from the pipe to the plate, and a plug inserted into the hole to form a water outlet between the plug and a surface of the plate forming the hole. The plug may be partially inserted into the hole. The plug may comprise a stem partially inserted into the hole having a diameter smaller than a diameter of the hole and a head formed above the stem, wherein at least a portion of the head has a diameter larger than the diameter of the hole.

The plug may be configured such that liquid discharged through the water outlet may be deflected and spread out to allow formation of an annular liquid film on the plate. An upper portion of the hole may have a widening diameter that increases from a bottom end to a top end, and the water outlet may be formed in a ring shape between the plug and a surface of the plate forming the upper portion of the hole.

An upper end of the plug may have a diameter larger than a diameter of the bottom end of the upper portion of the hole and smaller than the top end of the upper portion of the hole. An upper end of the plug may be higher than an edge of the plate when the plug may be inserted into the hole.

Embodiments disclosed herein may be implemented as a liquid dispenser comprising a tank, a pump installed inside the tank to pump liquid, a pipe connected to the pump through which liquid pumped by the pump flows, and a plate provided above the tank having a hole communicating with the pipe. The plate may include a top inclined upward from the hole while maintaining a constant inclination from the hole toward an edge of the plate.

The plate may have an outer circumferential surface that may be inclined downward from the top of the plate to a bottom of the plate. The pump may be configured to pump liquid at varying pumping rates.

A support may be provided below the plate to support the plate. The plate may be detachably coupled to the support. The plate may include a first boss protruding downward from a bottom of the plate and having a hole. The support may include a second boss protruding downward at a position corresponding to the first boss. The second boss may be inserted into the hole of the first boss. The pipe may be provided within the hole of the first boss and a hole of the second boss.

The plate may have an edge protrusion protruded downward from the edge of the plate. The edge protrusion may be inclined inward from the top of the plate to a bottom of the plate. The support may have an outer circumferential surface configured to contact and fit within an inner circumferential surface of the edge protrusion.

The plate may include a plurality of ribs projecting from the top of the plate. The plurality of ribs divide the top of the plate body into equivalent sections around the hole of the plate. The top of the plate may be a super-hydrophobic surface including fine protrusions protruding from the top of the plate. The plate may be a ceramic-coated stainless steel plate.

An illumination assembly may be provided between the plate and the tank. The plate may be formed of a translucent material.

Embodiment disclosed herein may be implemented as a liquid dispenser, including a tank, a pump installed inside the tank, a pipe connected to the pump, and a plate provided above the tank and including a hole communicating with the pipe. The plate may include an upper surface inclined upward from the hole toward an edge of the plate, and a side surface that inclines inward from the upper surface to a lower surface.

Embodiments disclosed herein may be implemented as a liquid dispenser including a tank, a pump installed inside the tank, a pipe connected to the pump, a plate provided above the tank and having a hole communicating with the pipe to supply liquid from the pipe to the plate, and a plug or diverter inserted into the hole to form a water outlet between the diverter and a surface of the plate forming the hole. The diverter may be partially inserted into the hole.

The diverter may comprise a stem partially inserted into the hole having a diameter smaller than a diameter of the hole, and a head formed above the stem. At least a portion of the head may have a diameter larger than the diameter of the hole. The diverter may be configured such that liquid discharged through the water outlet may be deflected and spread out to allow formation of an annular liquid film on the plate. An upper portion of the hole may have a widening diameter that increases from a bottom end to a top end. The water outlet may be formed in a ring shape between the diverter and a surface of the plate forming the upper portion of the hole. An upper end of the diverter may have a diameter larger than a diameter of the bottom end of the upper portion of the hole and smaller than the top end of the upper portion of the hole. An upper end of the diverter may be higher than an edge of the plate when the diverter may be inserted into the hole.

The effects of embodiments disclosed herein are not limited to the effects mentioned above, and other effects not mentioned may be clearly understood by those skilled in the art from the description of the claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid dispenser, comprising:
   a tank;
   a pump installed inside the tank to pump liquid;
   a pipe connected to the pump through which liquid pumped by the pump flows;
   a plate provided above the tank having a hole communicating with the pipe, wherein the plate includes a top inclined upward from the hole while maintaining a constant inclination from the hole toward an edge of the plate; and
   a support provided below the plate to support the plate, wherein the plate is detachably coupled to the support,
   wherein the plate has an edge protrusion protruded downward from the edge of the plate, and wherein the edge protrusion is inclined inward from the top of the plate to a bottom of the plate,
   wherein the support has an outer circumferential surface with a recess configured to directly contact and receive an inner circumferential surface of the edge protrusion,
   wherein the plate includes a first boss protruding downward from a bottom of the plate and having a hole, and the support includes a second boss protruding downward at a position corresponding to the first boss,
   wherein the liquid dispenser further comprises:
      a coupler; and
      a sealing ring provided between the coupler and the second boss,
   wherein the coupler includes a lower end that receives an upper end of the pipe, and an upper end that is received in the hole of the first boss and defines an outflow passage that guides liquid received from the pipe toward the hole of the plate, and
   wherein the sealing ring includes an upper end provided between the first boss and the second boss, and a lower end having an outer diameter larger than an outer diameter of the upper end of the sealing ring to support a bottom of the second boss.

2. The liquid dispenser of claim 1, wherein the plate has an outer circumferential surface that is inclined downward from the top of the plate to a bottom of the plate.

3. The liquid dispenser of claim 1, wherein the pump is configured to pump liquid at varying pumping rates.

4. The liquid dispenser of claim 1, wherein the coupler includes a UV filter, and an upper portion of the UV filter is inserted into the hole of the first boss.

5. The liquid dispenser of claim 1, wherein the pipe is provided within the hole of the first boss and a hole of the second boss.

6. The liquid dispenser of claim 1, wherein the plate includes a plurality of ribs projecting from the top of the plate, and wherein the plurality of ribs divide the top of the plate into equivalent sections around the hole of the plate.

7. The liquid dispenser of claim 1, wherein the top of the plate is a super-hydrophobic surface including fine protrusions protruding from the top of the plate.

8. The liquid dispenser of claim 1, wherein the plate is a ceramic-coated stainless steel plate.

9. The liquid dispenser of claim 1, wherein the support includes an illumination assembly, and wherein the plate is formed of a translucent material.

10. The liquid dispenser of claim 1, further comprising a liquid guide formed with a drain passage to discharge liquid falling from the plate into the tank, wherein the liquid guide is provided below and spaced apart from the plate, and wherein the support is provided between the plate and the liquid guide.

11. The liquid dispenser of claim 10, wherein the liquid guide further includes:
    an outer wall which is inclined outward toward from a bottom end of the outer wall toward an upper end of the outer wall, wherein the outer wall is provided on the tank; and
    an inner wall provided at an inner side of the outer wall, wherein the drain passage is formed between the inner wall and the outer wall, wherein the outer wall is lower than an upper end of the plate and an upper end of the support, and wherein the support is provided on the inner wall.

12. The liquid dispenser of claim 1, further including a proximity sensor to sense a position of a pet within a predetermined distance range of the liquid dispenser, wherein the pump is activated when at least the proximity sensor senses the pet to be within the predetermined distance range.

13. A liquid dispenser, including:
    a tank;
    a pump installed inside the tank;
    a pipe connected to the pump;
    a plate provided above the tank and including a hole communicating with the pipe, wherein the plate includes:
       an upper surface inclined upward from the hole toward an edge of the plate; and a side surface that inclines inward from the upper surface to a lower surface; and a support provided below the plate to support the plate, wherein the plate is detachably coupled to the support, wherein the plate has an edge protrusion protruded downward from the side surface of the plate, and wherein the edge protrusion is inclined inward from the upper surface of the plate to a bottom of the plate, wherein the support has an outer circumferential surface including a recess configured to directly contact and receive an inner circumferential surface of the edge protrusion, wherein the plate includes a first boss protruding downward from a bottom of the plate and having a hole, and the support includes a downward protruding second boss, wherein the liquid dispenser further comprises:
a coupler; and
a sealing ring provided between the coupler and the second boss, wherein an upper end of the coupler is received in the Bole of the first boss, and wherein the sealing ring includes a radially extending flange that supports a lower end of the second boss, and a vertical protrusion that extends upward from the flange to separate lower ends of the first boss and the second boss.

14. A liquid dispenser, including:
a tank;
a pump installed inside the tank;
a pipe connected to the pump;
a plate provided above the tank and having a hole communicating with the pipe to supply liquid from the pipe to the plate;
a diverter inserted into the hole, and a water outlet formed between the diverter and the hole; and
a support provided below the plate to support the plate, wherein the plate is detachably coupled to the support, wherein the plate has an edge protrusion protruded downward from an edge of the plate, and wherein the edge protrusion is inclined inward from a top of the plate to a bottom of the plate, wherein the support has an outer circumferential surface including a recess configured to directly contact and receive an inner circumferential surface of the edge protrusion, wherein the plate includes a first boss protruding downward from the plate and having a hole, and the support includes a second boss protruding downward from the support, wherein the liquid dispenser further comprises:
a UV filter; and
a sealing ring provided around UV filter, wherein the UV filter includes a lower end that receives a portion of the pipe, and an upper end that is received in the hole of the first boss and defines an outflow passage that receives liquid from the pipe, the UV filter outputting UV light in the outflow passage, wherein an upper portion of the sealing ring is provided between the first boss and the second boss, and a lower portion of the sealing ring extends from the UV filter to support a lower end of the second boss.

15. The liquid dispenser of claim 14, wherein the diverter is partially inserted into the hole.

16. The liquid dispenser of claim 15, wherein the diverter comprises:
a stem partially inserted into the hole having a diameter smaller than a diameter of the hole; and
a head formed above the stem, wherein at least a portion of the head has a diameter larger than the diameter of the hole.

17. The liquid dispenser of claim 15, wherein the diverter is configured such that liquid discharged through the water outlet is deflected and spread out to allow formation of an annular liquid film on the plate.

18. The liquid dispenser of claim 15, wherein an upper portion of the hole has a widening diameter that increases from a bottom end to a top end, and wherein the water outlet is formed in a ring shape between the diverter and the upper portion of the hole.

19. The liquid dispenser of claim 18, wherein an upper end of the diverter has a diameter larger than a diameter of the bottom end of the upper portion of the hole and smaller than the top end of the upper portion of the hole.

20. The liquid dispenser of claim 14, wherein an upper end of the diverter is higher than an edge of the plate when the diverter is inserted into the hole.

* * * * *